United States Patent
Leppänen et al.

(10) Patent No.: US 10,115,434 B2
(45) Date of Patent: Oct. 30, 2018

(54) METHOD, APPARATUS AND COMPUTER PROGRAM PRODUCT FOR EDITING MEDIA CONTENT

(71) Applicant: Nokia Technologies Oy, Espoo (FI)

(72) Inventors: Jussi Leppänen, Tampere (FI); Arto Lehtiniemi, Lempäälä (FI); Pasi Saari, Jyväskylä (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 193 days.

(21) Appl. No.: 14/746,319

(22) Filed: Jun. 22, 2015

(65) Prior Publication Data

US 2016/0012857 A1    Jan. 14, 2016

(30) Foreign Application Priority Data

Jul. 10, 2014  (GB) .................................. 1412251.9

(51) Int. Cl.
  *G11B 27/32*   (2006.01)
  *G11B 20/10*   (2006.01)
  (Continued)

(52) U.S. Cl.
  CPC ............ *G11B 27/32* (2013.01); *G10L 21/055* (2013.01); *G11B 20/10527* (2013.01);
  (Continued)

(58) Field of Classification Search
  CPC ..... G10L 21/055; G11B 27/32; G11B 21/055; G11B 27/038; G11B 27/10; G11B 27/28
  (Continued)

(56) References Cited

U.S. PATENT DOCUMENTS 7,430,360 B2 *  9/2008  Abecassis ............... G11B 19/02
                                                          348/E5.105
8,319,086 B1 * 11/2012  Iampietro ............... G11B 27/10
                                                          700/94
(Continued)

FOREIGN PATENT DOCUMENTS

EP          1587111 A1    10/2005
WO    2010/068175 A2     6/2010
(Continued)

OTHER PUBLICATIONS

Campbell et al., "Audio Quality Assessment Techniques—A Review, and Recent Developments", Signal Processing, vol. 89, No. 8, Aug. 2009, pp. 1-27.
(Continued)

*Primary Examiner* — Mishawn Hunter
(74) *Attorney, Agent, or Firm* — Alston & Bird LLP

(57) ABSTRACT

In an example embodiment, a method, apparatus and computer program product are provided. The method includes facilitating receipt of a first media content comprising a first audio track and a first video track, and a second media content comprising a second audio track. Section mapping between a first and a second plurality of audio sections associated with the first and second audio tracks, respectively is performed to determine a plurality of mapping audio sections. Relative position of at least one video transition with respect to the audio section is determined. A corresponding at least one video transition associated with at least one video transition is created in a mapping audio section, based on the relative position of the at least one video transition in the audio section. The first video track is modified based on the relative position of the corresponding at least one video transition in mapping audio section.

20 Claims, 6 Drawing Sheets

(51) Int. Cl.
*G10L 21/055* (2013.01)
*G11B 27/038* (2006.01)
*G11B 27/10* (2006.01)
*G11B 27/28* (2006.01)

(52) U.S. Cl.
CPC ............ *G11B 27/038* (2013.01); *G11B 27/10* (2013.01); *G11B 27/28* (2013.01)

(58) Field of Classification Search
USPC .......................................... 386/207, 224, 285
See application file for complete search history.

(56) References Cited

U.S. PATENT DOCUMENTS

| | | | |
|---|---|---|---|
| 2003/0160944 A1* | 8/2003 | Foote .................... | G03B 31/00 352/1 |
| 2004/0263914 A1* | 12/2004 | Yule ....................... | H04L 29/06 358/402 |
| 2005/0042591 A1* | 2/2005 | Bloom ................... | G11B 27/034 434/307 A |
| 2005/0217462 A1 | 10/2005 | Thomson et al. | |
| 2008/0019576 A1* | 1/2008 | Senftner ................ | G06T 15/00 382/118 |
| 2009/0171995 A1* | 7/2009 | Silvester ............ | G06F 17/30035 |
| 2010/0183280 A1* | 7/2010 | Beauregard .......... | G11B 27/034 386/285 |
| 2011/0230987 A1* | 9/2011 | Anguera Miro ........ | G10L 25/48 700/94 |
| 2012/0041954 A1* | 2/2012 | Curtis .................... | H04N 5/783 707/740 |
| 2013/0077805 A1 | 3/2013 | Kirsch | |
| 2014/0121794 A1 | 5/2014 | Eronen et al. | |
| 2015/0155008 A1* | 6/2015 | Herberger ............. | G11B 27/034 386/224 |
| 2015/0318020 A1* | 11/2015 | Pribula .................. | H04N 21/43615 386/227 |

FOREIGN PATENT DOCUMENTS

| | | |
|---|---|---|
| WO | 2011/110486 A1 | 9/2011 |
| WO | 2013/074207 A1 | 5/2013 |
| WO | 2014/091281 A1 | 6/2014 |
| WO | 2014/093713 A1 | 6/2014 |
| WO | 2014/207297 A1 | 12/2014 |

OTHER PUBLICATIONS

Paulus et al., "Audio-Based Music Structure Analysis", In Proceedings of the International Society for Music Information Retrieval Conference, Aug. 9-13, 2010, pp. 625-636.

"Soundhound", Soundhound Inc, Retrieved on May 26, 2015, Webpage available at : http://www.soundhound.com/.

Serra et al., "Audio Cover Song Identification and Similarity:Background, Approaches, Evaluation, and Beyond", Advances in Music Information Retrieval Studies in Computational Intelligence, vol. 274, 2010, pp. 307-332.

Serra et al., "Chroma Binary Similarity and Local Alignment Applied to Cover Song Identification", IEEE Transactions on Audio, Speech, and Language Processing, vol. 16, No. 6, Aug. 2008, pp. 1138-1151.

Maddage et al., "Content-Based Music Structure Analysis With Applications to Music Semantics Understanding", Proceedings of the 12th annual ACM international conference on Multimedia, Oct. 10-16, 2004, pp. 112-119.

"MIRtoolbox", Centre of Excellence in Music Research, Retrieved on May 27, 2015, Webpage available at : https://www.jyu.fi/hum/laitokset/musiikki/en/research/coe/materials/mirtoolbox.

Search Report received for corresponding United Kingdom Patent Application No. 1412251.9, dated Jan. 12, 2015, 4 pages.

Extended European Search Report received for corresponding European Patent Application No. 15169094.8, dated Dec. 8, 2015, 6 pages.

Office action received for corresponding European Patent Application No. 15169094.8, dated Sep. 19, 2016, 5 pages.

* cited by examiner

METHOD, APPARATUS AND COMPUTER PROGRAM PRODUCT FOR EDITING MEDIA CONTENT

TECHNICAL FIELD

Various implementations relate generally to method, apparatus, and computer program product for editing media content.

BACKGROUND

Various electronic devices are widely used for editing media content, for example a video content, audio content, and the like. Users may edit media recorded at an event in order to improve the user experience when the edited media is accessed. During editing, users may change a background audio track of the media content with a better quality audio track. In certain scenarios, the users may replace the background audio track with an audio track that may be different than the background audio track. However, the available methods for replacing the background audio track may pose challenges in some scenarios where the media content and the replacement audio track may be of different duration and/or lengths, thereby rendering the a poor quality edited media content as output.

SUMMARY OF SOME EMBODIMENTS

Various aspects of examples embodiments are set out in the claims.

In a first aspect, there is provided a method comprising: facilitating receipt of a first media content comprising a first audio track and a first video track, and a second media content comprising a second audio track; determining a first plurality of audio sections associated with the first audio track and a second plurality of audio sections associated with the second audio track; performing section mapping between the first plurality of audio sections and the second plurality of audio sections to determine a plurality of mapping audio sections in the second audio track corresponding to the first plurality of audio sections; determining, in an audio section of the first plurality of audio sections, relative position of at least one video transition with respect to the audio section; creating a corresponding at least one video transition associated with the at least one video transition in a mapping audio section of the plurality of mapping audio sections, the mapping audio section being corresponding to the audio section of the first plurality of audio sections, the corresponding at least one video transition being created at a same relative position with respect to the mapping audio section as the relative position of the at least one video transition with respect to the audio section; and modifying the first video track based on the relative position of the corresponding at least one video transition in the mapping audio section to generate a second video track corresponding to the second audio track.

In a second aspect, there is provided an apparatus comprising at least one processor; and at least one memory comprising computer program code, the at least one memory and the computer program code configured to, with the at least one processor, cause the apparatus to perform at least: facilitate receipt of a first media content comprising a first audio track and a first video track, and a second media content comprising a second audio track; determining a first plurality of audio sections associated with the first audio track and a second plurality of audio sections associated with the second audio track; perform section mapping between the first plurality of audio sections and the second plurality of audio sections to determine a plurality of mapping audio sections in the second audio track corresponding to the first plurality of audio sections; determine, in an audio section of the first plurality of audio sections, relative position of at least one video transition with respect to the audio section; create a corresponding at least one video transition associated with the at least one video transition in a mapping audio section of the plurality of mapping audio sections, the mapping audio section being corresponding to the audio section of the first plurality of audio sections, the corresponding at least one video transition being created at a same relative position with respect to the mapping audio section as the relative position of the at least one video transition with respect to the audio section; and modify the first video track based on the relative position of the corresponding at least one video transition in the mapping audio section to generate a second video track corresponding to the second audio track.

In a third aspect, there is provided a computer program product comprising at least one computer-readable storage medium, the computer-readable storage medium comprising a set of instructions, which, when executed by one or more processors, cause an apparatus to perform at least: facilitate receipt of a first media content comprising a first audio track and a first video track, and a second media content comprising a second audio track; determining a first plurality of audio sections associated with the first audio track and a second plurality of audio sections associated with the second audio track; perform section mapping between the first plurality of audio sections and the second plurality of audio sections to determine a plurality of mapping audio sections in the second audio track corresponding to the first plurality of audio sections; determine, in an audio section of the first plurality of audio sections, relative position of at least one video transition with respect to the audio section; create a corresponding at least one video transition associated with the at least one video transition in a mapping audio section of the plurality of mapping audio sections, the mapping audio section being corresponding to the audio section of the first plurality of audio sections, the corresponding at least one video transition being created at a same relative position with respect to the mapping audio section as the relative position of the at least one video transition with respect to the audio section; and modify the first video track based on the relative position of the corresponding at least one video transition in the mapping audio section to generate a second video track corresponding to the second audio track.

In a fourth aspect, there is provided an apparatus comprising: means for facilitating receipt of a first media content comprising a first audio track and a first video track, and a second media content comprising a second audio track; means for determining a first plurality of audio sections associated with the first audio track and a second plurality of audio sections associated with the second audio track; means for performing section mapping between the first plurality of audio sections and the second plurality of audio sections to determine a plurality of mapping audio sections in the second audio track corresponding to the first plurality of audio sections; means for determining, in an audio section of the first plurality of audio sections, relative position of at least one video transition with respect to the audio section; means for creating a corresponding at least one video transition associated with the at least one video transition in a mapping audio section of the plurality of mapping audio sections, the mapping audio section being corresponding to the audio section of the first plurality of audio sections, the corresponding at least one video transition being created at a same relative position with respect to the mapping audio section as the relative position of the at least one video transition with respect to the audio section; and means for modifying the first video track based on the relative position of the corresponding at least one video transition in the mapping audio section to generate a second video track corresponding to the second audio track.

In a fifth aspect, there is provided a computer program comprising program instructions which when executed by an apparatus, cause the apparatus to: facilitate receipt of a first media content comprising a first audio track and a first video track, and a second media content comprising a second audio track; determining a first plurality of audio sections associated with the first audio track and a second plurality of audio sections associated with the second audio track; perform section mapping between the first plurality of audio sections and the second plurality of audio sections to determine a plurality of mapping audio sections in the second audio track corresponding to the first plurality of audio sections; determine, in an audio section of the first plurality of audio sections, relative position of at least one video transition with respect to the audio section; create a corresponding at least one video transition associated with the at least one video transition in a mapping audio section of the plurality of mapping audio sections, the mapping audio section being corresponding to the audio section of the first plurality of audio sections, the corresponding at least one video transition being created at a same relative position with respect to the mapping audio section as the relative position of the at least one video transition with respect to the audio section; and modify the first video track based on the relative position of the corresponding at least one video transition in the mapping audio section to generate a second video track corresponding to the second audio track.

BRIEF DESCRIPTION OF THE FIGURES

Various embodiments are illustrated by way of example, and not by way of limitation, in the figures of the accompanying drawings in which.

DETAILED DESCRIPTION

Example embodiments and their potential effects are understood by referring to FIGS. 1 through 7B of the drawings.

Figure 1:
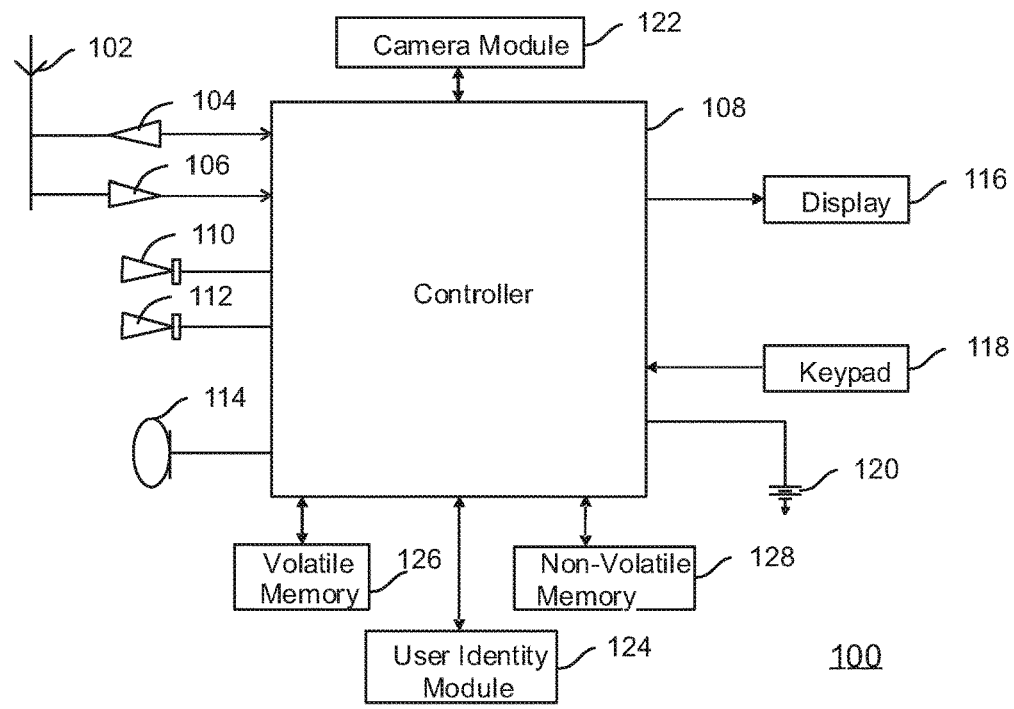
FIG. 1 illustrates a device, in accordance with an example embodiment.

FIG. 1 illustrates a device 100 in accordance with an example embodiment. It should be understood, however, that the device 100 as illustrated and hereinafter described is merely illustrative of one type of device that may benefit from various embodiments, therefore, should not be taken to limit the scope of the embodiments. As such, it should be appreciated that at least some of the components described below in connection with the device 100 may be optional and thus in an example embodiment may include more, less or different components than those described in connection with the example embodiment of FIG. 1. The device 100 could be any of a number of types of mobile electronic devices, for example, portable digital assistants (PDAs), pagers, mobile televisions, gaming devices, cellular phones, all types of computers (for example, laptops, mobile computers or desktops), cameras, audio/video players, radios, global positioning system (GPS) devices, media players, mobile digital assistants, or any combination of the aforementioned, and other types of communications devices.

The device 100 may include an antenna 102 (or multiple antennas) in operable communication with a transmitter 104 and a receiver 106. The device 100 may further include an apparatus, such as a controller 108 or other processing device that provides signals to and receives signals from the transmitter 104 and the receiver 106, respectively. The signals may include signaling information in accordance with the air interface standard of the applicable cellular system, and/or may also include data corresponding to user speech, received data and/or user generated data. In this regard, the device 100 may be capable of operating with one or more air interface standards, communication protocols, modulation types, and access types. By way of illustration, the device 100 may be capable of operating in accordance with any of a number of first, second, third and/or fourth-generation communication protocols or the like. For example, the device 100 may be capable of operating in accordance with second-generation (2G) wireless communication protocols IS-136 (time division multiple access (TDMA)), GSM (global system for mobile communication), and IS-95 (code division multiple access (CDMA)), or with third-generation (3G) wireless communication protocols, such as Universal Mobile Telecommunications System (UMTS), CDMA1000, wideband CDMA (WCDMA) and time division-synchronous CDMA (TD-SCDMA), with 3.9G wireless communication protocol such as evolved-universal terrestrial radio access network (E-UTRAN), with fourth-generation (4G) wireless communication protocols, or the like. As an alternative (or additionally), the device 100 may be capable of operating in accordance with non-cellular communication mechanisms. For example, computer networks such as the Internet, local area network, wide area networks, and the like; short range wireless communication networks such as include Bluetooth® networks, Zigbee® networks, Institute of Electric and Electronic Engineers (IEEE) 802.11x networks, and the like; wireline telecommunication networks such as public switched telephone network (PSTN).

The controller 108 may include circuitry implementing, among others, audio and logic functions of the device 100. For example, the controller 108 may include, but are not limited to, one or more digital signal processor devices, one or more microprocessor devices, one or more processor(s) with accompanying digital signal processor(s), one or more processor(s) without accompanying digital signal processor(s), one or more special-purpose computer chips, one or more field-programmable gate arrays (FPGAs), one or more controllers, one or more application-specific integrated circuits (ASICs), one or more computer(s), various analog to digital converters, digital to analog converters, and/or other support circuits. Control and signal processing functions of the device 100 are allocated between these devices according to their respective capabilities. The controller 108 thus may also include the functionality to convolutionally encode and interleave message and data prior to modulation and transmission. The controller 108 may additionally include an internal voice coder, and may include an internal data modem. Further, the controller 108 may include functionality to operate one or more software programs, which may be stored in a memory. For example, the controller 108 may be capable of operating a connectivity program, such as a conventional Web browser. The connectivity program may then allow the device 100 to transmit and receive Web content, such as location-based content and/or other web page content, according to a Wireless Application Protocol (WAP), Hypertext Transfer Protocol (HTTP) and/or the like. In an example embodiment, the controller 108 may be embodied as a multi-core processor such as a dual or quad core processor. However, any number of processors may be included in the controller 108.

The device 100 may also comprise a user interface including an output device such as a ringer 110, an earphone or speaker 112, a microphone 114, a display 116, and a user input interface, which may be coupled to the controller 108. The user input interface, which allows the device 100 to receive data, may include any of a number of devices allowing the device 100 to receive data, such as a keypad 118, a touch display, a microphone 114 or other input device. In embodiments including the keypad 118, the keypad 118 may include numeric (0-9) and related keys (#, *), and other hard and soft keys used for operating the device 100. Alternatively or additionally, the keypad 118 may include a conventional QWERTY keypad arrangement. The keypad 118 may also include various soft keys with associated functions. In addition, or alternatively, the device 100 may include an interface device such as a joystick or other user input interface. The device 100 further includes a battery 120, such as a vibrating battery pack, for powering various circuits that are used to operate the device 100, as well as optionally providing mechanical vibration as a detectable output.

In an example embodiment, the device 100 includes a media capturing element, such as a camera, video and/or audio module, in communication with the controller 108. The media capturing element may be any means for capturing an image, video and/or audio for storage, display or transmission. In an example embodiment in which the media capturing element is a camera module 122, the camera module 122 may include a digital camera capable of forming a digital image file from a captured image. As such, the camera module 122 includes all hardware, such as a lens or other optical component(s), and software for creating a digital image file from a captured image. Alternatively, the camera module 122 may include the hardware needed to view an image, while a memory device of the device 100 stores instructions for execution by the controller 108 in the form of software to create a digital image file from a captured image. In an example embodiment, the camera module 122 may further include a processing element such as a co-processor, which assists the controller 108 in processing image data and an encoder and/or decoder for compressing and/or decompressing image data. The encoder and/or decoder may encode and/or decode according to a JPEG standard format or another like format. For video, the encoder and/or decoder may employ any of a plurality of standard formats such as, for example, standards associated with H.261, H.262/MPEG-2, H.263, H.264, H.264/MPEG-4, MPEG-4, and the like. In some cases, the camera module 122 may provide live image data to the display 116. Moreover, in an example embodiment, the display 116 may be located on one side of the device 100 and the camera module 122 may include a lens positioned on the opposite side of the device 100 with respect to the display 116 to enable the camera module 122 to capture images on one side of the device 100 and present a view of such images to the user positioned on the other side of the device 100.

The device 100 may further include a user identity module (UIM) 124. The UIM 124 may be a memory device having a processor built in. The UIM 124 may include, for example, a subscriber identity module (SIM), a universal integrated circuit card (UICC), a universal subscriber identity module (USIM), a removable user identity module (R-UIM), or any other smart card. The UIM 124 typically stores information elements related to a mobile subscriber. In addition to the UIM 124, the device 100 may be equipped with memory. For example, the device 100 may include volatile memory 126, such as volatile random access memory (RAM) including a cache area for the temporary storage of data. The device 100 may also include other non-volatile memory 128, which may be embedded and/or may be removable. The non-volatile memory 128 may additionally or alternatively comprise an electrically erasable programmable read only memory (EEPROM), flash memory, hard drive, or the like. The memories may store any number of pieces of information, and data, used by the device 100 to implement the functions of the device 100.

Figure 2:
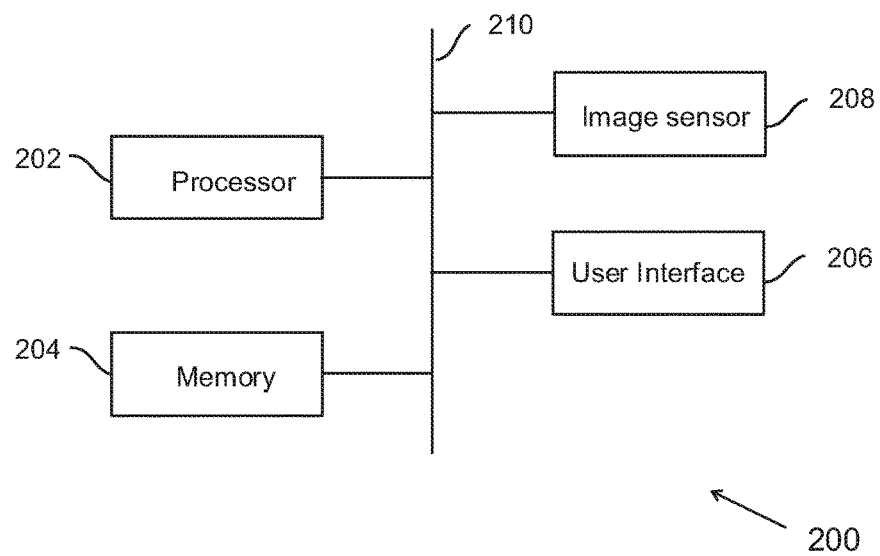
FIG. 2 illustrates an apparatus for editing media content, in accordance with an example embodiment.

FIG. 2 illustrates an apparatus 200 for editing media content, in accordance with an example embodiment. The apparatus 200 may be employed, for example, in the device 100 of FIG. 1. However, it should be noted that the apparatus 200, may also be employed on a variety of other devices both mobile and fixed, and therefore, embodiments should not be limited to application on devices such as the device 100 of FIG. 1. Alternatively, embodiments may be employed on a combination of devices including, for example, those listed above. Accordingly, various embodiments may be embodied wholly at a single device (for example, the device 100) or in a combination of devices. Furthermore, it should be noted that the devices or elements described below may not be mandatory and thus some may be omitted in certain embodiments.

The apparatus 200 includes or otherwise is in communication with at least one processor 202 and at least one memory 204. Examples of the at least one memory 204 include, but are not limited to, volatile and/or non-volatile memories. Some examples of the volatile memory include, but are not limited to, random access memory, dynamic random access memory, static random access memory, and the like. Some examples of the non-volatile memory include, but are not limited to, hard disks, magnetic tapes, optical disks, programmable read only memory, erasable programmable read only memory, electrically erasable programmable read only memory, flash memory, and the like. The memory 204 may be configured to store information, data, applications, instructions or the like for enabling the apparatus 200 to carry out various functions in accordance with various example embodiments. For example, the memory 204 may be configured to buffer input data comprising media content for processing by the processor 202. Additionally or alternatively, the memory 204 may be configured to store instructions for execution by the processor 202.

An example of the processor 202 may include the controller 108. The processor 202 may be embodied in a number of different ways. The processor 202 may be embodied as a multi-core processor, a single core processor; or combination of multi-core processors and single core processors. For example, the processor 202 may be embodied as one or more of various processing means such as a coprocessor, a microprocessor, a controller, a digital signal processor (DSP), processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. In an example embodiment, the multi-core processor may be configured to execute instructions stored in the memory 204 or otherwise accessible to the processor 202. Alternatively or additionally, the processor 202 may be configured to execute hard coded functionality. As such, whether configured by hardware or software methods, or by a combination thereof, the processor 202 may represent an entity, for example, physically embodied in circuitry, capable of performing operations according to various embodiments while configured accordingly. For example, if the processor 202 is embodied as two or more of an ASIC, FPGA or the like, the processor 202 may be specifically configured hardware for conducting the operations described herein. Alternatively, as another example, if the processor 202 is embodied as an executor of software instructions, the instructions may specifically configure the processor 202 to perform the algorithms and/or operations described herein when the instructions are executed. However, in some cases, the processor 202 may be a processor of a specific device, for example, a mobile terminal or network device adapted for employing embodiments by further configuration of the processor 202 by instructions for performing the algorithms and/or operations described herein. The processor 202 may include, among other things, a clock, an arithmetic logic unit (ALU) and logic gates configured to support operation of the processor 202.

A user interface 206 may be in communication with the processor 202. Examples of the user interface 206 include, but are not limited to, input interface and/or output user interface. The input interface is configured to receive an indication of a user input. The output user interface provides an audible, visual, mechanical or other output and/or feedback to the user. Examples of the input interface may include, but are not limited to, a keyboard, a mouse, a joystick, a keypad, a touch screen, soft keys, and the like. Examples of the output interface may include, but are not limited to, a display such as light emitting diode display, thin-film transistor (TFT) display, liquid crystal displays, active-matrix organic light-emitting diode (AMOLED) display, a microphone, a speaker, ringers, vibrators, and the like. In an example embodiment, the user interface 206 may include, among other devices or elements, any or all of a speaker, a microphone, a display, and a keyboard, touch screen, or the like. In this regard, for example, the processor 202 may comprise user interface circuitry configured to control at least some functions of one or more elements of the user interface 206, such as, for example, a speaker, ringer, microphone, display, and/or the like. The processor 202 and/or user interface circuitry comprising the processor 202 may be configured to control one or more functions of one or more elements of the user interface 206 through computer program instructions, for example, software and/or firmware, stored on a memory, for example, the at least one memory 204, and/or the like, accessible to the processor 202.

In an example embodiment, the apparatus 200 may include an electronic device. Some examples of the electronic device include communication device, media capturing device with communication capabilities, computing devices, and the like. Some examples of the electronic device may include a mobile phone, a personal digital assistant (PDA), and the like. Some examples of computing device may include a laptop, a personal computer, and the like. In an example embodiment, the electronic device may include a user interface, for example, the user interface 206, having user interface circuitry and user interface software configured to facilitate a user to control at least one function of the electronic device through use of a display and further configured to respond to user inputs. In an example embodiment, the electronic device may include a display circuitry configured to display at least a portion of the user interface 206 of the electronic device. The display and display circuitry may be configured to facilitate the user to control at least one function of the electronic device.

In an example embodiment, the electronic device may be embodied as to include a transceiver. The transceiver may be any device operating or circuitry operating in accordance with software or otherwise embodied in hardware or a combination of hardware and software. For example, the processor 202 operating under software control, or the processor 202 embodied as an ASIC or FPGA specifically configured to perform the operations described herein, or a combination thereof, thereby configures the apparatus 200 or circuitry to perform the functions of the transceiver. The transceiver may be configured to receive media content. Examples of media content may include audio content, video content, data, and a combination thereof.

In an example embodiment, the electronic device may be embodied as to include an image sensor, such as an image sensor 208. The image sensor 208 may be in communication with the processor 202 and/or other components of the apparatus 200. The image sensor 208 may be in communication with other imaging circuitries and/or software, and is configured to capture digital images or to make a video or other graphic media files. The image sensor 208 and other circuitries, in combination, may be an example of the camera module 122 of the device 100.

The components 202, 204, 206, and 208 may hereinafter be referred to as components 202-208. These components 202-208 may communicate to each other via a centralized circuit system 210 for editing of media content. The centralized circuit system 210 may be various devices configured to, among other things, provide or enable communication between the components (202-208) of the apparatus 200. In certain embodiments, the centralized circuit system 210 may be a central printed circuit board (PCB) such as a motherboard, main board, system board, or logic board. The centralized circuit system 210 may also, or alternatively, include other printed circuit assemblies (PCAs) or communication channel media.

In various example embodiments, the media content, for example a first media content may include, but are not limited to, video with audio, animation, collection of still images with background song/audio/music, and/or combinations of these. For instance, the multimedia content may include any content that can be captured by media capturing devices, for example, a camera, camcorders and the like, or that can be stored on multimedia storage devices, for example, hard disks, flash drives, RAM, ROM, disks and any computer-readable media, and that is capable of being played on multimedia systems and/or is capable of being displayed on the user interface 206 (for example, the display 116).

In an example embodiment, the editing of the media content may be performed in various scenarios. For instance, in an example scenario, a music band may be playing live, so that a live version of the performance may correspond rhythmically 'exactly' to a studio version of the song being performed. The live performance may be shot (video recording with background song(s) or audio track) recorded with a single camera or multiple cameras located at different locations. In case the performance is recorded with a single camera, during editing an audio track of the video shot may be replaced by a studio recording of the audio track being played. In another example scenario, during the live performance the song/audio track played may be faster than the studio version of the audio track, so that during editing, the video track of the live performance may be edited to be aligned with the studio version of the audio track. In yet another example scenario, the song structure of the live version of the audio track may differ from the studio version of the audio track. For instance, the live version of the audio track may have a longer 'guitar solo section' than the guitar solo section in the studio version of the audio track. In this example scenario, the live version may be edited by trimming the live version of the audio track so as to match with that of the studio version of the audio track. In still another example scenario, an audio section (for example, a guitar solo) in the live version may be shorter than in the studio version of the audio track, and during editing the guitar solo section in the live version may be stretched so that boundaries between the live version and the studio version of the audio track may match. In still another example scenario, the song structures of the live version and the studio version of the audio track may differ. For example, the performer may have left out a verse, and added an additional chorus, and played a solo in a different place in the live version of the audio track. During editing, the guitar solo portions may be placed where the guitar solo is in the studio version, in addition the video material from the live guitar solo version may be added to the place where the new guitar solo is located. In still another example scenario, a playback song in a media content may be replaced with an entirely new audio track. For example, a user may record a video of a birthday party with a birthday song being played in the background, and while editing the video the user may replace the background birthday song/music with a different song.

In various example embodiments, the apparatus 200 may be caused to edit the background audio track of the media content to another version of the same audio track or a different audio track such that various 'video transitions' of the media content may be shifted to a relatively same location in the edited media content, with respect to the background audio track, as the relatively location of the video transitions in the media content. Herein, the term 'video transition' may refer a transition when the video recording is stopped and started again, for recording a next shot. The video transition is present, for example, at a change of video scene/shot in the video track, for example, due to a change of presentation of the video track by one or more other cameras, or switching off and on (or stopped and started recording) of the media capturing device. For example, a live concert in a stadium may be recorded by five different cameras installed at five different locations in the stadium. The recordings of the five different cameras may together be consolidated to generate a final video recording of the concert such that during different time periods in the recording, the portions of the video recordings may be taken from different cameras (for example, depending on the different views of the concert being presented by five different cameras at different times).

In an example embodiment, the apparatus 200 may be caused to facilitate receipt of a first media content and a second media content. In an example embodiment, the first media may include a first audio track and a first video track, and the second media content may include a second audio track. In particular, the first media content may include a video recording of an event, for example a concert, a birthday party, a dance performance, or a compilation of a pictures and/or videos of an event such that the compilation is in form of a video with a music/song being played in the background. The second audio track of the second media content may include a song with which the first audio track is to be replaced. In an example embodiment, the second audio track may be associated with the first audio track. For example, the second audio track may be a studio recorded version of the first audio track. For instance, the first audio track may include a video recording of a live concert, and the second media content may include an audio track that may be the studio recorded version of the song(s) being recorded at the live concert. In an example embodiment, the second audio track may not be associated with the first audio track. For example, the second audio track may be a completely different song from the second audio track. For instance, the first media content may include a video recorded during a holiday which may include a background song (for example, the first audio track). In some example scenarios, the video recorded during the holiday may not include an audio track, however, during the editing of the recorded video, an audio track such as the first audio track may be included in the background of the video. At a later instance, the user may wish to replace the background song/audio in the recorded video with a new song (for example, the second audio track) such that the new song may be unrelated to the background song (for example, the first audio track) of the recorded video. In an example embodiment, a processing means may be configured to facilitate receipt of the first media content and the second media content at the apparatus 200. An example of the processing means may include the processor 202, which may be an example of the controller 108.

In various example embodiments, the apparatus 200 may be caused to access or receive the first media content and the second media content from sources external to the apparatus 200 and/or stored and/or otherwise accessible to the apparatus 200. Accessing or receiving the multimedia content from external sources includes streaming the media content from web server, local servers, and any other location from where the media content may be downloaded, streamed through wired or wireless connections. Additionally or alternatively, the access of the multimedia content includes a playback of the stored or streamed multimedia content at the apparatus 200.

In an example embodiment, the processor 202 is configured to, with the content of the memory 204, and optionally with other components described herein, to cause the apparatus 200 to determine a first plurality of audio sections associated with the first audio track and a second plurality of audio sections associated with the second audio track. Various examples of audio sections may include, but are not limited to verse, chorus, solo and the like. An example illustrating the plurality of audio sections of the first audio track and the second audio track is illustrated and described with reference to FIG. 3.

In an example embodiment, the apparatus 200 may be caused to determine the plurality of audio sections based on performing one or more of a structure analysis, bar analysis, and beat analysis of the first audio track and the second audio track. In musicology (or music theory), the term 'beat' may be a basic unit of time being utilized for referring to a rhythmic element of music. In certain usages, the term 'beat' may be indicative of a rate at which most people tap their foot on floor while listening to a piece of music. The term beat is also known as tactus or foot tapping rate. The beat analysis, as used herein may be performed by a variety of known methods that may perform some form of signal processing and frequency analysis for detecting beats in the audio tracks, for example the first audio track and the second audio track. The term 'bar' may refer to a measure or a segment of time that may be defined as a number of beats in a particular duration, where each of the beats may be assigned a particular note value. In an example embodiment, the apparatus 200 may be caused to determine the plurality of audio sections associated with the first audio track and the second audio track so as to determine respective boundaries of the plurality of audio sections. In an example embodiment, determining the respective boundaries of the plurality of audio sections may include determining respective time stamps associated with the respective boundaries of each of the plurality of audio sections. In an example embodiment, a processing means may be caused to determine the first plurality of audio sections and the second plurality of audio sections. An example of the processing means may include the processor 202, which may be an example of the controller 108.

In an example embodiment, the processor 202 is configured to, with the content of the memory 204, and optionally with other components described herein, to cause the apparatus 200, to determine a plurality of audio features associated with the first audio track and the second audio track based at least on the plurality of audio sections associated with the first audio track and the second audio track, respectively. Examples of the audio features associated with the first audio track and the second audio track may include an average spectrum of the audio track, spectral flux, estimated tempo, pulse clarity, mel frequency cepstral coefficients, and the like. In an example embodiment, the apparatus 200 may be caused to determine a first plurality of audio features for the first plurality of audio sections based at least on the time stamps associated with the first plurality of audio sections. The apparatus 200 may further be caused to determine a second plurality of audio features for the second plurality of audio sections based at least on the time stamps associated with the second plurality of audio sections. In an example embodiment, a processing means may be caused to determine the plurality of audio features associated with the first audio track and the second audio track. An example of the processing means may include the processor 202, which may be an example of the controller 108.

In an example embodiment, the processor 202 is configured to, with the content of the memory 204, and optionally with other components described herein, to cause the apparatus 200 to determine a plurality of mapping audio sections in the second audio track corresponding to the first plurality of audio sections based on a section mapping between the first plurality of audio sections and the second plurality of audio sections. In an example embodiment, the section mapping between the first plurality of audio features and the second plurality of audio features may be determined by computing a cross similarity matrix between the first set of audio features and the second set of audio features. An example cross similarity matrix for determining the plurality of mapping audio sections in the second audio track is illustrated and described in detail with reference to FIG. 4.

In an example embodiment, x-axis of the cross similarity matrix may represent the first plurality of audio sections while y-axis of the cross similarity matrix may represent the second plurality of audio sections. In an example embodiment, the values of the cross similarity matrix may correspond to correlation measure between the audio sections associated with the first plurality of audio sections and the second plurality of audio sections. In an example embodiment, the values of the cross similarity matrix may be computed based on the similarity levels between the respective features of the first plurality of audio sections and the second plurality of audio sections. Various known and/or custom methods may be utilized for computing the cross similarity matrix. For example, Gaussian timbre models, rhythmic structures, fluctuation patterns, the Kullback-Leibler divergence, or any combination thereof may be utilized for computing the cross similarity matrix. An example of the computation of the cross similarity matrix is described further in detail with reference to FIG. 4. In an example embodiment, a processing means may be caused to compute the cross similarity matrix between the first plurality of audio sections and the second plurality of audio sections. An example of the processing means may include the processor 202, which may be an example of the controller 108.

In an example embodiment, the processor 202 is configured to, with the content of the memory 204, and optionally with other components described herein, to cause the apparatus 200 to perform section mapping between the first audio track and the second audio track based on the cross similarity matrix. In an example embodiment, the section mapping may be performed based on a determination of an optimized path through the cross similarity matrix. In an example embodiment, the section mapping between the audio sections of the first audio track and the second audio track along the optimized path may facilitate in providing a best mapping between the audio sections of the first audio track and the second audio track. In an example embodiment, the best path may be the path that has an average lowest cost per step through the path. An example of cost computation for determination of the optimized path is described in detail with reference to FIG. 4. In an example embodiment, a processing means may be caused to perform section mapping between the first audio track and the second audio track based on the cross similarity matrix. An example of the processing means may include the processor 202, which may be an example of the controller 108.

In some example embodiments, the apparatus 200 may further be caused to impose one or more constraints for computation of the optimized path through the cross similarity matrix. For example, one of the constraints while determining the best path may include that—each of the audio sections associated with the second audio track be covered in the path so that every audio section of the second audio track may have a corresponding audio section in the first audio track. Various other such constraints may be determined and applied during the determination of the optimized path in the cross similarity matrix. It will be noted that the constraints being applied to the determination of optimized path may be determined/selected based on the applications employing the apparatus 200, or manually by the users. Some of the examples of such constraints are described in detail with reference to FIG. 4.

In an example embodiment, the apparatus 200 may be caused to compute the cost associated with a plurality of possible paths in the cross similarity matrix. In an example embodiment, the processor 202 is configured to, with the content of the memory 204, and optionally with other components described herein, to cause the apparatus 200 to compute the cost associated with each of the steps of the possible paths. In an example embodiment, the cost associated with the each step may be indicative of a degree of similarity between the audio sections associated with the first audio track and the second audio track at that step of the path. In an example embodiment, the cost at the each step of the path may be computed based on the following expression:

$$\text{Cost}(i, j) = \frac{1}{aS_{ij} + (1-a)D_{ij}}$$

where, i and j define a cell of the cross similarity matrix associated with the respective audio sections of the first audio track and the second audio track, $S_{ij}$ is the similarity between sections i and j of the first audio track and the second audio track, $D_{ij}$ is the distance from the diagonal (defined as |i−j|) of the cross similarity matrix, and a represents a weight parameter associated with the similarity component ($S_{ij}$) and the distance component ($D_{ij}$) of the audio sections.

In an example embodiment, the apparatus 200 may be caused to perform an exhaustive search through the possible paths through the cross similarity matrix, and determine a path as the optimized path that is associated with minimum average cost per step. In an example embodiment, the steps of the optimized path may provide the section mapping between the audio sections associated with the first audio track and the second audio track. For example, in case an audio section such as an audio section $S_{23}$ is determined to be at a step of the optimized path, then the section #2 of the first audio track and the section #3 of the second audio track may be mapped together. It should be noted that such mapping of the audio sections of the first audio track and the second audio track may facilitate, in some embodiments, changing the order of the respective audio sections in songs as well as allows new audio sections to appear in the second audio track. Moreover, such mapping of the audio sections may facilitate in removing/adding some of the audio sections from the first audio track.

In an example embodiment, the processor 202 is configured to, with the content of the memory 204, and optionally with other components described herein, to cause the apparatus 200 to modify the first media content based at least on a mapping of the first audio track and the second audio track, so as to generate a modified media content. In an example embodiment, the modified media content may include a second video track and the second audio track. For example, in case the first media content is a recording of a video at a live concert, then the second media content may include the recording of the media content being modified to include, for example a studio recorded version of the background song being played at the concert, and a video track being modified to match with the studio recorded version of the background song.

In an example embodiment, for modifying the first media content, the processor 202 is configured to, with the content of the memory 204, and optionally with other components described herein, to cause the apparatus 200 to determine relative positions of video transitions in the first plurality of audio sections of the first audio track. In an example embodiment, the apparatus 200 may be caused to determine, for an audio section of the plurality of first audio sections, a mapping audio section in the second plurality of audio sections. In an example embodiment, the mapping audio section in the second plurality of audio sections may be determined based on the section mapping between the audio sections of the first plurality of audio sections and the second plurality of audio sections. An example illustrating a plurality of mapping audio sections corresponding to the first plurality of audio sections is illustrated and described in detail with reference to FIG. 3. In an example embodiment, during the section mapping of the audio sections in the first plurality of audio sections and the second plurality of audio sections, there may be variations of correspondence between the audio sections. For example, some of the audio sections of the second audio track may be determined to be longer or shorter than the corresponding audio section, or may not be associated with any of the audio sections of the first plurality of audio sections, and so on and so forth.

In an example embodiment, the apparatus 200 may be caused to determine a plurality of video transitions associated with the first plurality of audio sections. For example, the apparatus 200 may be caused to determine at least one video transition associated with an audio section of the first plurality of audio sections. In an example embodiment, the apparatus 200 may be caused to determine a relative position of the at least one video transition with respect to the audio section. In an example embodiment, the apparatus 200 may be caused to determine relative positions of the plurality of video transitions with respect to the boundaries of the audio sections. In an example embodiment, the boundaries of the audio sections may be determined based on the time stamps associated with the audio section. In an example embodiment, determining the relative position of the at least one video transition may include determining a time stamp, for example a first time stamp associated with the at least one video transition with respect to the boundaries of the audio section. In some example embodiments, instead of determining the plurality of video transitions associated with the first audio track, the apparatus 200 may be caused to facilitate receipt of the plurality of video transitions. For example, the apparatus 200 may receive the plurality of video transitions based on a user input on a user interface, such as the user interface 206. In an example embodiment, a processing means may be caused to determine relative positions of video transitions in the first plurality of audio sections of the first audio track. An example of the processing means may include the processor 202, which may be an example of the controller 108.

In an example embodiment, the apparatus 200 may be caused to create a corresponding plurality of video transitions associated with the plurality of mapping audio sections. For example, a corresponding at least one video transition associated with the at least one video transition in a mapping audio section of the plurality of mapping audio sections may be created. In an example embodiment, the corresponding at least one video transition may be created at a same relative position with respect to the mapping audio section as the relative position of the at least one video transition with respect to the audio section. For example, if the at least one video transition is located at a distance equal to one fourth length of the audio section from a start position of the audio section in the first audio track, then a corresponding at least one video transition in the second audio track may be created/positioned at the same relative distance (i.e. at one-fourth length distance of the new audio section) from the boundary of the corresponding audio section in the second audio track. In an example embodiment, determining the relative position of the corresponding at least one video transition may include determining a time stamp, for example, a second time stamp associated with the corresponding at least one video transition in the corresponding (or mapping) audio section in the second audio track.

In an example embodiment, the position of the plurality of video transitions may be aligned to beats and/or bars of the audio sections of the first audio track. For example, the video transition position may be aligned to the beats and or bars of the audio track such that the video transition is placed in the same beat of the bar as in the first audio track. For instance, if a video transition occurred at a 2nd beat of a bar at 25% time in the first audio track, then the corresponding video transition in the second audio track may be created/positioned in the bar that occurs at time 25% in the corresponding audio section on the 2nd beat. In an example embodiment, a processing means may be caused to create the corresponding at least one video transition associated with the at least one video transition in the mapping audio section. An example of the processing means may include the processor 202, which may be an example of the controller 108.

In an example embodiment, upon determining position of the corresponding plurality of video transitions in the respective mapping audio sections, the apparatus 200 may be caused to create a modified multimedia content by modifying the first media content based on the relative positioning of the plurality of video transitions in the second video track. In an example embodiment, for creating the modified media content, the apparatus 200 may be caused to compare the time spans associated with video transitions in the first audio track with the corresponding time spans associated with corresponding video transitions in the second audio track. In an example embodiment, the apparatus 200 may be caused to detect any variation between the time spans associated with the first audio track and the corresponding time spans associated with the second audio track, and modify the first video track accordingly to generate the second video track.

In an example embodiment, the apparatus 200 may be caused to determine a first length of a video segment occurring between the at least one video transition and boundaries of the audio section based on the first time stamp. The first length may be indicative of a time span associated with a video transition in the audio section associated with the first audio track. In an example embodiment, the apparatus 200 may further be caused to determine a second length of a corresponding video segment occurring between the corresponding at least one video transition and boundaries of the mapping audio section based on the second time stamp. The second length may be indicative of the time span associated with the corresponding video transition in the mapping audio section associated with the second audio track. In an example embodiment, a processing means may be caused to determine the first length and the second length video transition in the audio section and the mapping audio section, respectively. An example of the processing means may include the processor 202, which may be an example of the controller 108. In an example embodiment, the apparatus 200 may be caused to compare the first length with the second length, and further determine whether to modify or retain the video segment associated with the first length of the audio section. In an example embodiment, the video segment may include a portion of the first video track associated with the first length of the audio section. In an example embodiment, a processing means may be caused to compare the first length with the second length, and further determine whether to modify or retain the video segment associated with the first length of the audio section. An example of the processing means may include the processor 202, which may be an example of the controller 108.

In an example embodiment, on comparison of the first length with the second length, the apparatus 200 may be caused to determine the second length being shorter than the first length. In an example embodiment, the apparatus 200 may further be caused to determine whether the difference between the first length and the second length is greater than a first threshold distance. In an example embodiment, where the difference between the first length and the second length being greater than the first threshold distance, the excess length of the video segment between the video transitions may be cropped so as to match with the second length. In an example embodiment, the cropped length of the first video track may be utilized for constructing the corresponding portion of the second video track. In another example embodiment, where the difference between the first length and the second length is determined to be shorter than the first threshold distance, the portion of the first video track may be fast-forwarded so as to match the first length with the second length.

In another example embodiment, based on comparison of the first length with the second length, the second length may be determined to be greater than the first length. In such a scenario, it may be determined whether the difference between the first length and the second length is greater than a second threshold distance. In an example embodiment, where the difference between the first length and the second length is determined to be greater than the second threshold distance, a video transition may be created after the relative position of the at least one video transition in the portion of the first video track, and the portion between the created video transition and the previous video transition may be filled up with one or more video tracks being recorded at the same time. For example, in case of an event such as a live concert, a plurality of recordings of the event may be captured by a plurality of users and/or cameras installed at the location of live event. In an example embodiment, where the difference between the first length and the second length is determined to be greater than the second threshold distance, a speed of playback of the portion of the first video track may be reduced to match the first length with the second length.

In an example embodiment, based on the comparison of the first length with the second length, the second length may be determined to be equal to the first length. In such a scenario, the first length may be retained, and the video segment/portion associated with the first length of the first video track may be utilized for generating a corresponding portion/video segment of the second video track. In an example embodiment, the apparatus 200 may be caused to concatenate a plurality of video segments being generated for generating the second video track.

Some example embodiments of performing accesses of multimedia content are further described with reference to FIGS. 3 to 7B. It shall be noted that these FIGS. 3 to 7B represent one or more example embodiments only, and should not be considered limiting to the scope of the various example embodiments.

Figure 3:
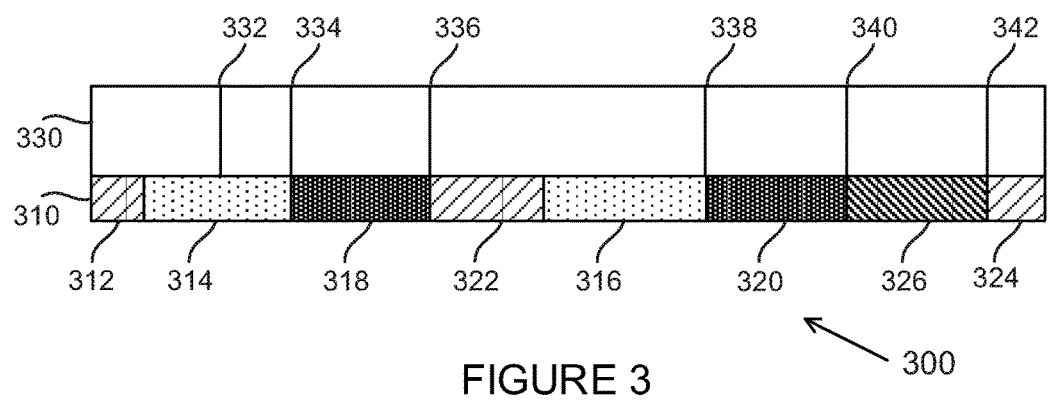
FIG. 3 illustrates an example representation of structure of media content, in accordance with an example embodiment.

FIG. 3 illustrates an example representation 300 of a structure of a media content, in accordance with an example embodiment. In an example embodiment, the media content may be associated with an event. For example, the media content may be a recording of a birthday party, a live concert, a vacation, and the like. In some example scenarios, the media content may include a video track along with a background audio track associated with the event. In some other example scenarios, the media content may include a compilation of a plurality of pictures/images in form of a video track with an audio track being played in the background. In another example embodiment, the media content may include an audio track such as an audio track 310, and a video track such as a video track 330. In an example embodiment, the audio track 310 may include a plurality of audio sections that may be musically similar or dissimilar. Such plurality of audio sections may exhibit variation in features/parameters such as dynamics, execution of note groups, musical keys, articulation, tempo progression and the like. As illustrated in FIG. 3, the audio track 310 may include the plurality of audio sections, for example, audio sections 312, 314, 316, 318, 320, 322, 324, and 326 (hereinafter referred to as 312-326). Examples of audio sections associated with an audio track may include an intro, verse, chorus, bridge, instrumental and ending (outro). For example, the audio sections 314 and 316 may include verse, the audio sections 318, 320 may include chorus, the audio section 326 may include a guitar solo, and so on. In some example scenarios, some of the audio sections in the audio track may be blank, for example, the audio sections such as 312, 322, and 324 are blank.

In an example embodiment, the structure of the audio track 310 may be determined based on any of the known methods. In an example embodiment, the structure analysis of the audio track 310 is performed to determine the respective boundaries of the plurality of audio sections 312-326 associated with the audio track 310. In an example embodiment, the structure analysis of the audio track 310 is performed to determine the respective time stamps associated with the respective boundaries of the plurality of audio sections 312-326.

As depicted with reference to FIG. 3, the video track 330 corresponding to the audio track 310 may include a plurality of video transitions, such as video transitions 332, 334, 336, 338, 340, and 342 (hereinafter referred to as 332-342). Herein, a 'video transition' may refer to a change of scene in the video track 330 that may be captured by one or more media capturing devices configured to capture the media content associated with an event. For example, while capturing a video of an event such as a live concert, a plurality of users (for example, audiences or media houses) may capture the live event using their respective media capturing devices. The media content captured by the plurality of users may be utilized for generating a video track, for example, the video track 330 associated with the event such that the video track may include a plurality of video transitions indicative of end of a video shot, and beginning of a new video shot. In certain embodiments, the video segments may be representative of change of scenes of the event in the recorded media content.

In some example scenarios, a user may be interested in editing the media content 300. Reasons for editing the media content may include, for example, bad quality of the audio in the media content, poor choice of background audio track in the media content, and so on and so forth. For example, the media content may include a recording of a live event but the user may not be satisfied with the quality of audio of the recoded media content and may wish to replace the audio of the recorded media content with a studio recorded version of the audio track. In some other example scenarios, the user may possess a recorded video of, for example, a birthday party where a birthday song is being played. However, the user may not like the choice of the birthday song being played, and may wish to replace that song with another song. In such scenarios, along with replacing the audio track of the media content with a desired audio track, a difference in structure of the audio tracks, for example the first audio track and the second audio track may be determined, and based on the difference, the first video track may be modified to match the second audio track.

In an example embodiment, a determination of a similarity measure between the first audio track and the second audio track may facilitate determining the mapping between the first audio content and the second audio content. In an example embodiment, the mapping between the first audio content and the second audio content may be determined by determining a cross similarity matrix between the first audio content and the second audio content. An example of the cross similarity matrix being computed between the between the first audio content and the second audio content is depicted and explained with reference to FIG. 4.

Figure 4:
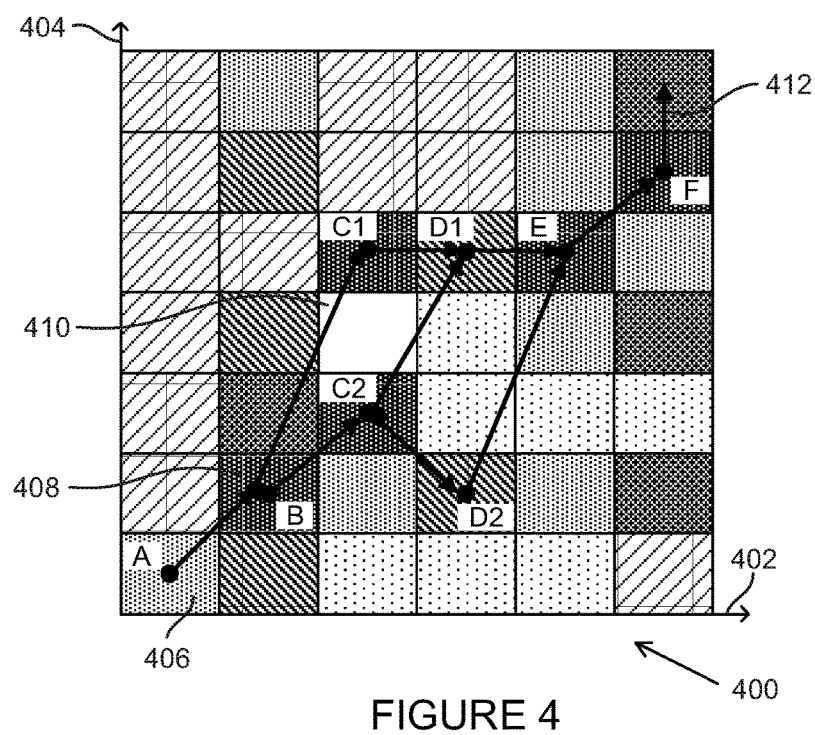
FIG. 4 illustrates an example cross similarity matrix being computed between a first audio track and a second audio track, in accordance with an example embodiment.

FIG. 4 illustrates an example cross similarity matrix 400 being computed between a first audio track and a second audio track, in accordance with an example embodiment. In an example embodiment, for determination of the measure of similarity between the first audio track and the second audio track, the audio features associated with the audio track and the second audio track may be extracted. Examples of the audio features may include, but are not limited to, an average spectrum of the audio track, spectral flux, estimated tempo, pulse clarity, mel frequency cepstral coefficients, and the like. In an example embodiment, the features associated with the first audio track and the second audio track may be extracted by passing the first audio track and the second audio track, respectively in a feature extractor along with the boundaries of the audio sections associated with the audio tracks. On computation of the features associated with each audio content, pairwise similarity scores (or correspondence measure) between pairs of audio sections belonging to the two audio tracks, namely the first audio track and the second audio track may be determined. In an example embodiment, the pairwise similarity score may be determined by computing a distance between the pair of audio sections.

While computing the cross similarity matrix, the audio sections belonging to the first audio track are indicated along x-axis 402 and the audio sections belonging the second audio track are indicated along y-axis 404. In an example embodiment, the audio sections in the matrix may be arranged in a chronological manner. In an example embodiment, the values of respective cells of the matrix 400 may be determined based on a similarity score of the sections associated with the respective cells. For example, the value of cell 406, which is a measure of similarity between an audio section (for example, a first audio section) belonging to the first audio and an audio section (for example, a first audio section) belonging to the second audio track, may be determined based on similarity computation between the respective features associated with the audio sections of the first audio track and the second audio track, respectively.

In various example embodiments, a large number of similarity determining or estimating methods may be utilized for determining/computing similarity between the sections of the first audio track and the second audio track. Examples of similarity determining methods include Gaussian timbre models, rhythmic structures, fluctuation patterns, the Kullback-Leibler divergence, or any combination thereof. In an example embodiment, the similarity determining or estimating methods such as Kullback-Leibler divergence may facilitate in calculating the similarity between the audio sections, for example the first plurality of audio sections and the second plurality of audio sections belonging to the first audio track and the second audio track, respectively. In an example embodiment, the pairwise similarity score may be computed by determining a Kullback-Leibler divergence between the audio sections belonging to the first audio track and the second audio track. In an example embodiment, a vector representation of the audio sections of the audio tracks may be generated such that each track may be represented by a plurality of features. A pairwise mapping between the audio sections may be performed on the basis of similarity score such that the distances between the audio sections represent similarity between the corresponding vectors associated with the audio sections. In some example embodiments, instead of Kullback-Leibler divergence, an Euclidean distance may be computed between the feature vectors associated with the audio sections so as to determine similarity between the audio sections. In some embodiments, the pairwise similarity between the audio sections may be represented in the similarity matrix based on the color and/or shade assigned to each of the cells of the similarity matrix. For example, the cells assigned a darker shade may be representative of higher similarity while the cells assigned a lighter shade may be representative of higher similarity. For instance, a cell $S_{22}$ (marked 408) is representative of higher similarity between the corresponding audio sections such as audio sections #2, #2 belonging to the first audio track and the second audio track, respectively, while the cell $S_{34}$ (marked as 410) is representative of very low similarity between the corresponding audio sections such as audio sections #3, #4 belonging to the first audio track and the second audio track, respectively.

In an example embodiment, the color shades and/or the similarity scores may be utilized to determine a best path/optimal path through the cross similarity matrix 400, where the best path/optimal path may be indicative of a most appropriate mapping between the audio sections of the first audio track and the second audio track. In an example embodiment, the optimal path may be determined from a start segment of both the audio tracks, for example the cell 406, till the last segment of both audio track, such as a cell 412 of the matrix 400. In an example embodiment, the best path (from a plurality of other paths) may be the one that may be associated with an average lowest cost per step through the path. For example, there are three paths shown in FIG. 4, namely path P1 (A-B-C1-D1-E-F) and P2 (A-B-C2-D2-E-F) and P3 (A-B-C2-D1-E-F). Out of these three paths P1, P2, and P3 the optimal path is the one that is associated with the average lowest cost per step. For example, the path P2 may be associated with average lowest cost at each steps thereof, for example at each of the steps A-B, B-C2, C2-D2, D2-E, and E-F.

In various example embodiments, the determination of the optimal path may be performed by assuming one or more constraints to the path determination based on the cross similarity matrix. For example, one of the constraints may be that each of audio sections of second audio track be covered in the optimal path. For covering each of the audio sections belonging to the second audio track in the optimal path, each column of the matrix has to appear while determining the optimal path. Herein, it will be noted that by applying this constraint, the mapping of audio sections is performed such that every section of the second audio track has a corresponding section in the original song. In another example embodiment, a constraint on the optimal path determination may be that the optimal paths farther away from the diagonal of the matrix may be penalized more, thereby allowing the mapping to be applied chronologically for the first and second audio tracks. In yet another example embodiment, a constraint on the optimal path determination may be that the start cell and the end cell may be the first element and the last element respectively in the matrix, thereby ensuring that the complete audio track is utilized in determining the optimal path. In an example embodiment, a cost associated with each step of the path is computed. In an example embodiment, the cost associated with each step may be indicative of a degree of similarity between the audio sections associated with the first audio track and the second audio track at that path. In an example embodiment, the cost at each step of the path may be computed based on the following expression:

$$\text{Cost}(i, j) = \frac{1}{aS_{ij} + (1-a)D_{ij}}$$

where, i and j define a cell of the cross similarity matrix associated with the respective audio sections of the first audio track and the second audio track, $S_{ij}$ is the similarity between sections i and j of the second and the first audio track, and $D_{ij}$ is the distance from the diagonal (defined as |i−j|) of the cross similarity matrix, 'a' represents a weight parameter. In an example embodiment, the weight parameter may be utilized to weigh the components associated with similarity ($S_{ij}$) and distance ($D_{ij}$) differently. For example, in case, the value of 'a' is 1, only the similarity component ($S_{ij}$) is utilized for computing the cost between the audio sections. Also, when the value of 'a' is 0, only the distance component ($D_{ij}$) is utilized for computing the cost between the audio sections. In certain scenarios, where the value of 'a' lies between the 0 and 1, both the similarity component ($S_{ij}$) and the distance component ($D_{ij}$) are utilized for computing the cost between the audio sections.

In an example embodiment, an exhaustive search may be performed through all possible paths through the matrix to determine the optimal path associated with the lowest average cost per step. In an example embodiment, the steps associated with the most optimal path provide the mapping between the audio sections in the first audio track and the second audio track. It will be noted that the mapping of audio sections, as described herein, may even facilitate the audio sections to change an order thereof in the audio track during the editing of the first media content. Moreover, such an editing may facilitate in allowing new audio sections to appear and/or remove certain audio sections in the edited (or modified) media content. An example representation of mapping of the first audio track and the second audio track is illustrated and described further with reference to FIG. 5A-5B.

Figure 5A:
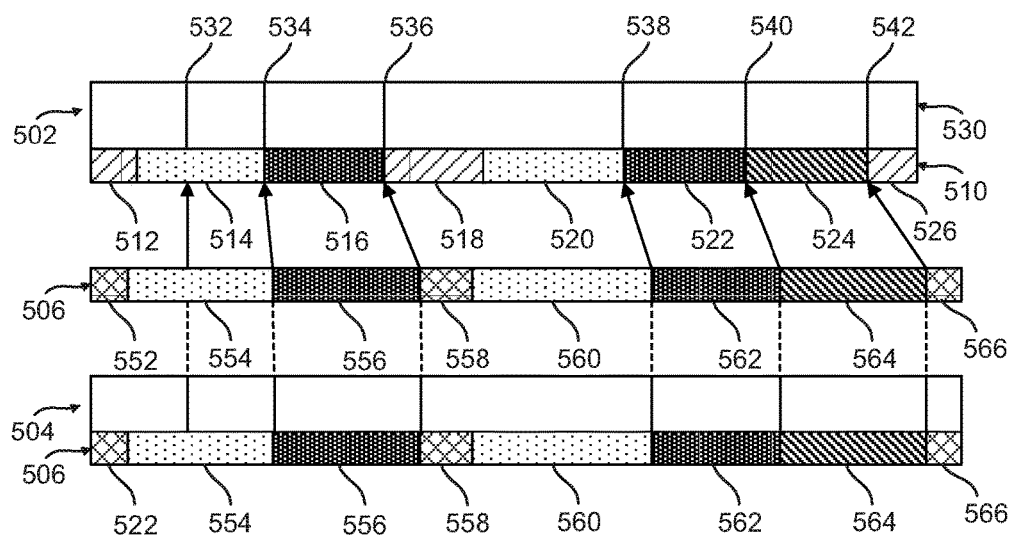
FIGS. 5A-5B illustrate an example representation of modifying (editing) a first media content, in accordance of an example embodiment.
Figure 5B:
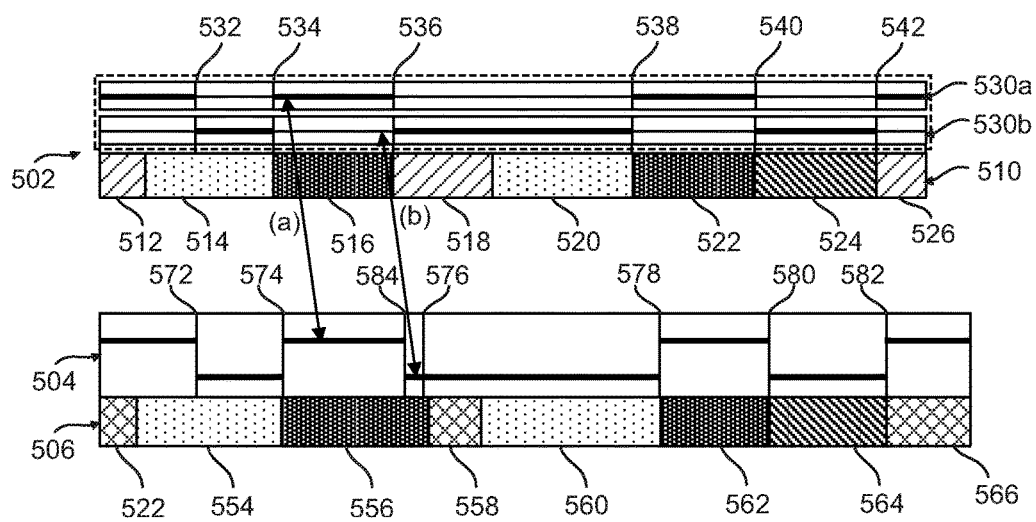

FIGS. 5A-5B illustrate an example representation of modifying (editing) a first media content, for example a first media content 502, in accordance of an example embodiment. As described with reference to FIGS. 2 and 3, the first media content 502 may be modified (or edited) to generate a modified media content, for example, a modified (or edited) media content 504. In an example embodiment, the first media content 502 may include a first audio track 510 and a first video track 530. In an example embodiment, the first media content 502 may be an example of the first media content 300 (FIG. 3).

In an example embodiment, the first video track 530 may include portions being derived from a plurality of pre-processed media content, which can be appropriately processed, manually or automatically, so as to generate the first video track 530. In an example embodiment, the plurality of pre-processed media content may include a plurality of distinct media contents being recorded by a plurality of users from multiple distinct locations. For example, in case of a live event, the plurality of users (for example, audiences) may capture the event on respective media capturing devices thereof. In some example embodiments, the plurality of pre-processed media content may be processed so as to generate the first video track. As illustrated in FIG. 5B, the first video track 530 is generated based on the media contents 530a and 530b being recorded by different users. In an example scenario, the portions of the video tracks may be selected from the media contents 530a and 530b based on multitude of factors such as clarity of captured media content, distance of the media capturing device from the event, features of media capturing device used for capturing the media content, and the like. It will be noted that the selection of portions of video tracks from different media content may also be performed based on user preferences, application using the media content, and any other factor, without limiting the scope of the disclosure.

In an example embodiment, a section mapping of the first audio track 510 and the second audio track 506 may be performed to determine the audio sections of the first audio track 510 and the second audio track 506, respectively. For example, the section mapping of the first audio track 510 may generate a first plurality of audio sections, for example, audio sections 512, 514, 516, 518, 520, 522 524, and 526. Also, the structure analysis of the second audio track 506 may generate a second plurality of audio sections, for example audio sections 552, 554, 556, 558, 560, 562, 564 and 566. Examples of an audio sections associated with the first audio track and the second audio track may include an intro, verse, chorus, bridge, instrumental and ending (outro). For example, the audio sections 514 and 516 may include verse, the audio sections 516, 522 may include chorus, the audio section 524 may include a guitar solo, and so on. In some example scenarios, some of the audio sections in the audio track may be blank, for example, the audio sections such as 512, 518, and 526 are blank. Similarly, the second plurality of audio sections may include one of intro, verse, chorus, bridge, instrumental and ending (outro).

In an example embodiment, based on the section mapping, a plurality of mapping audio section may be determined between the first plurality of audio sections and the second plurality of audio sections. As illustrated in the example scenario in FIG. 5A, the sections 516, 522, 514, 512 of the first audio track matches with the audio sections 556, 562, 554, 522, respectively and so on. However, during the mapping of audio sections of the two audio tracks, it may be determined that the lengths of the corresponding audio sections in the two audio tracks may or may not be equal. It will be noted that during section mapping some of the audio sections of the second plurality of audio sections may not match with any of the audio sections of the first plurality of audio sections.

In an example embodiment, portions of the first video track may be edited so as to generate an edited video track (for example a second video track), corresponding to the second audio track. In an example embodiment, modifying the first media content 502 may include (1) replacing the first audio track of the first media content with a second audio track, and (2) modifying the first video track of the first media content to generate the second video track. In an example embodiment, the first video track may be modified such that video transitions of the modified media content may be placed at the same relative position with respect to the corresponding audio sections in the modified media sections, as the relative positions of the corresponding video transitions of the first media content with respect to the audio sections of the first media content. In an embodiment, the position of the video transitions may be aligned to the beats and/or bars of the second audio track such that the video transitions may be positioned in the same beat of the bar as in the first audio track. For example, a video transition may appear at a nth beat of a bar at 50 percent time in the audio section of the first audio track, then the corresponding video transition may be positioned in the bar that may occur at a time 50 percent in the corresponding audio section on the nth beat. Based on the positioning of the video transitions at the same relative position with respect to the corresponding audio section, a modified media content may be created.

In an example embodiment, the video track in the edited media content may be aligned with the second audio track, since during editing relative locations of a plurality of video transitions with respect to the first plurality of audio sections is determined, and corresponding plurality of video transitions (corresponding to the plurality of video transitions) are automatically shifted such that their relative position with respect to the second audio track remains the same. For example, the first video track may include a plurality of video transitions such as video transitions 532, 534, 536, 538, 540, 542 at distinct positions in the first video track. In an example embodiment, the plurality of video transitions may be associated with audio sections of the first audio track. For example, the video transition 532 is shown to occur at a position in the verse audio section 514 of the first audio track. Similarly, the video transitions 534 and 536 are shown to occur at boundaries of the chorus audio section 516 of the first audio track.

In an example embodiment, a plurality of corresponding video transitions corresponding to the plurality of video transitions may be determined for generating the second media content. In an example embodiment, the plurality of corresponding video transitions may be determined based on the section mapping of audio sections between the first plurality of audio sections and a second plurality of audio section. Referring now to FIG. 5B, based on section mapping, corresponding to each of the plurality of video transitions such as video transitions 532, 534, 536, 538, 540, 542 associated with the first audio track, a corresponding plurality of video transitions associated with the second audio track may be determined. For example, for video transitions 532, 534, 536, 538, 540, and 542, a corresponding plurality of video transitions such as corresponding video transitions 572, 574, 576, 578, 580, and 582 may be determined.

In an example embodiment, determining the corresponding plurality of video transitions associated with the second audio track includes determining the relative positions of the corresponding plurality of video transitions with respect to the corresponding audio sections of the second plurality of audio sections. In an example embodiment, the relative positions of the corresponding plurality of video transitions may be same as relative positions of the plurality of video transitions with respect to the audio sections of the first audio track. For example, if relative position of the video transition 532 is in the middle of the audio section 514, then the relative position of a corresponding video transition 572 is in the middle of the mapping audio section 554. Similarly, if the relative positions of the video transitions 534 and 536 are at the boundaries of the audio section 516, then the relative position of a corresponding video transition 574 and 576, respectively are at the boundaries of the mapping audio section 556. Also, if the relative positions of the video transitions 538 and 540 are at the boundaries of the audio section 522, then the relative positions of corresponding video transitions 578 and 580 are at the boundaries of the mapping audio section 562, respectively.

In an example embodiment, determining the relative positions of the plurality of video transitions in the first audio track and a corresponding plurality of video transitions in the second audio track includes determining time stamps associated with each of the video transitions of the plurality of video transitions and the corresponding plurality of video transitions. In an example embodiment, for creating the corresponding plurality of video transitions, time stamps of the plurality of video transitions may be determined. For example, in an audio section having a video transition, a first time stamp for the video transition may be determined. In an example scenario, where the audio section includes more than one video transition, for example two video transitions, a first time stamp for each of the two video transitions may be determined. In an example embodiment, based on the first time stamp, relative position of the video transition in the audio section may be determined. For example, based on a time stamp of the video transition 532, relative position of the video transition 532 in the audio section 514 may be determined. In an example embodiment, the relative position of the video transition 532 may be determined based on the boundaries of the audio section 514. Based on the relative position of the video transition 532 with respect to the boundaries of the audio section 514, a corresponding video transition such as video transition 572 may be determined in the mapping audio section, for example the mapping audio section 554. In an example embodiment, the relative position of the video transition 572 may be determined based on the boundaries of the audio section 514. It will be noted that the relative positions of the plurality of corresponding video transitions in the plurality of mapping audio sections may be determined in a similar manner as the relative positions of the video transition 572 in the mapping audio section 554 is determined. In an embodiment, determining the relative positions of the plurality of corresponding video transitions in the mapping audio section includes determining time stamps associated with each of the plurality of corresponding video transitions. For example, in the mapping audio section 554, determining the relative position of the corresponding video transition 532 includes determining a time stamp, for example a second time stamp associated with the corresponding video transition 532.

In an example embodiment, the second video track may be generated based on the first video track and the relative position of the corresponding plurality of video transitions with respect to the mapping audio sections. In an example embodiment, firstly it may be determined whether the length of a video segment of the plurality of video segments of the first video track is to be modified or retained as such. In an example embodiment, the determination of whether to modify or retain the length of the video segment may be made based on a comparison of the length (also, referred to as 'first length') of the video segment occurring between a video transition and boundaries of the audio section, and the length (also, referred to as 'second length') of a corresponding video segment occurring between the corresponding video transition and boundaries of the mapping audio section. In an example embodiment, the first length may be determined based on the first time stamp and the time stamps of the boundaries of the audio section. In an example embodiment, the second length may be determined based on the second time stamp and the time stamps of the boundaries of the mapping audio section. In an example embodiment, based on the comparison of the first length with the second length for various video transitions and/or audio sections, it may be determined whether to modify/retain the lengths of the video segments. Various example scenarios of modifying/retaining the lengths of the plurality of portions of the first video track are described in following description.

In an example embodiment, on comparison of the first length with the second length, the second length may be determined to be shorter than the first length. For example, as illustrated in FIG. 5B, the first length i.e., length of the video segment between video transitions 538-540 in the mapping audio section 522 is determined to be smaller than the second length, i.e. the length of the corresponding video segment between the corresponding video transitions 578-580 in the mapping audio section 562. In such a scenario, it may be determined whether the difference between the first length and the second length is greater than a first threshold distance. In an example embodiment, where the difference between the first length and the second length being greater than a first threshold distance, the excess length of the video segment between the video transitions 538-540 may be cropped so as to match with the second length. In an example embodiment, the cropped length of the first video track may be utilized for constructing the corresponding portion of the second video track. In another example embodiment, where the difference between the first length and the second length is determined to be shorter than the first threshold distance, the portion of the first video track may be fast forwarded so as to match the first length with the second length.

In an example embodiment, based on comparison of the first length with the second length, the second length may be determined to be greater than the first length. For example, as illustrated in FIG. 5B, the second length i.e., length of the video segment between corresponding video transitions 574-576 in the mapping audio section 556 is determined to be greater than the first length, i.e. the length of the video segment between the video transitions 534-536 in the audio section 516. In such a scenario, it may be determined whether the difference between the first length and the second length is greater than a second threshold distance. In an example embodiment, where the difference between the first length and the second length is determined to be greater than the second threshold distance, a video transition may be created after the relative position of the at least one video transition in the portion of the first video track. For example, a video transition such as video transition 584 may be created, and the portion between 574-576 may be filled up with a video track being received from one or more other users. For example, in the present example the portion/video segment of the second video track between the video transitions 574-584 may be filled-up by video content being provided by one user (illustrated by marking (a) in FIG. 5B), and the portion of the video segment 584-576 may be filled-up by another user (illustrated by marking (b) in FIG. 5B). In an example embodiment, where the difference between the first length and the second length is determined to be greater than the second threshold distance, a speed of playback of the portion of the first video track may be reduced to match the first length with the second length.

In an example embodiment, based on the comparison of the first length with the second length, the second length may be determined to be equal to the first length. For example, the first length i.e., length of the video segment between the video transitions 532-534 in the audio section 514 is equal to the second length, i.e. the length of the video segment between the video transitions 572-574 in the mapping audio section 554. In such a scenario, the first length may be retained, and the video segment/portion associated with the first length of the first video track may be utilized for generating a corresponding portion/video segment of the second video track.

Herein, it will be noted that the video segments being derived from the first video track for generating the second video track may include video segments being received from one or more users. For example, as illustrated in FIG. 5B, the first video track includes a video track 544 and a video track 546 being received from different users. In an example embodiment, a plurality of video segments may be selected from the video tracks 530a, 530b, so as to appropriately fill-up the space between the corresponding plurality of video transitions, and generate the second media content. The selected video segments received from the media content 530a and the media content 530b may be concatenated to generate the second video track.

Figure 6:
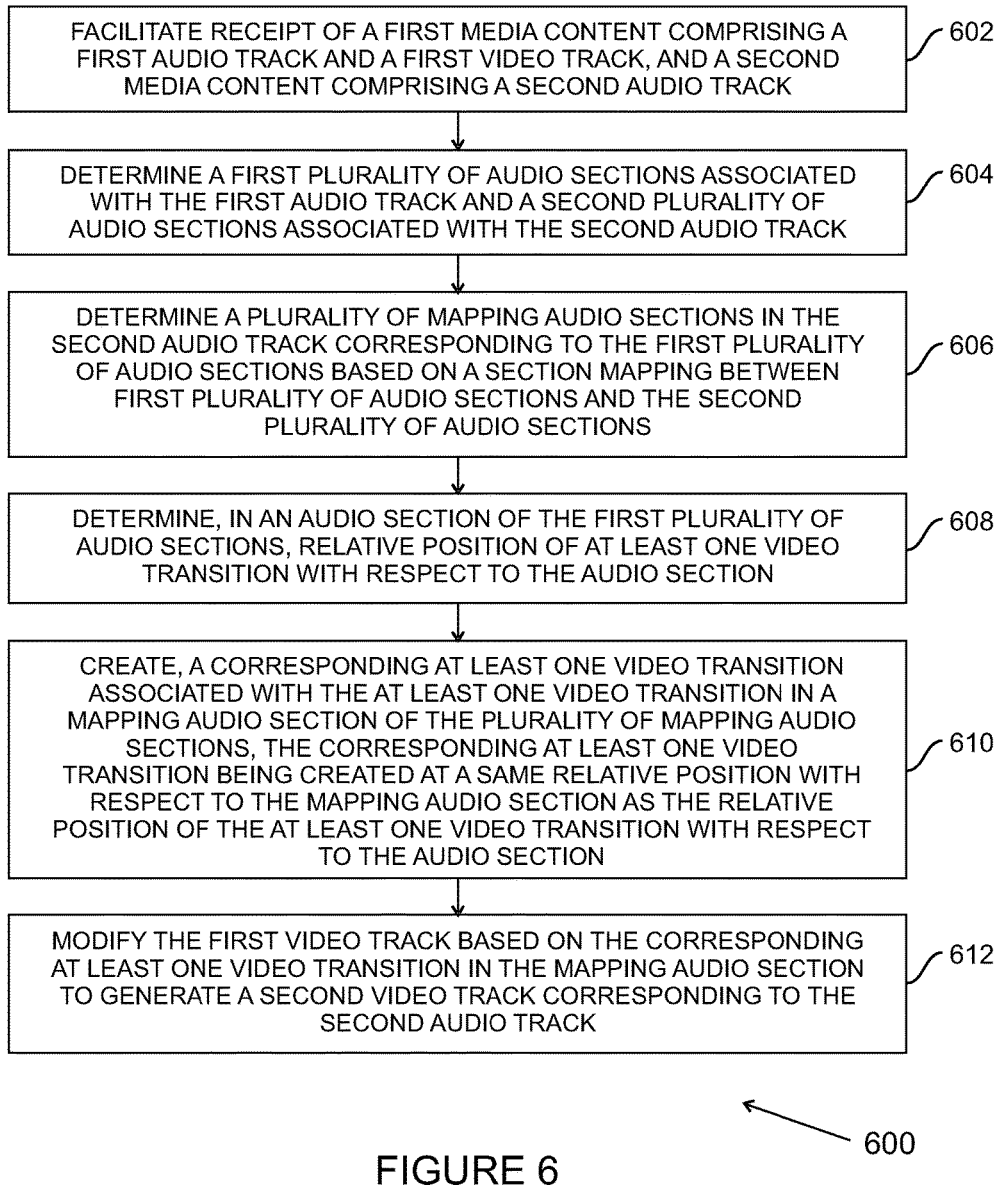
FIG. 6 illustrates an example flowchart depicting a method to perform editing of a media content, in accordance with an example embodiment.

FIG. 6 is a flowchart depicting example method 600 for editing of media content, for example a first media content, in accordance with an example embodiment. In an example embodiment, the method 600 includes facilitating access of the first media content and a second media content at an apparatus, for example the apparatus 200 (FIG. 2) and performing editing of the first media content based on the second media content for improving the quality of edited media content. The method 600 depicted in the flow chart may be executed by, for example, the apparatus 200 of FIG. 2.

At 602, receipt of the first media content and the second media content is facilitated. In an example embodiment, the first media content may include a first audio track and a first video track. For example, the first media content may be a recorded video of an event where the recorded video may include a background audio track also. In an example embodiment, the second media content may include a second audio track. In an example embodiment, the second audio track may be studio-recorded version of the first audio track or any other audio track that may be unrelated to the first audio track.

In an example embodiment, the first media content may be generated by preprocessing a plurality of media contents associated with the first media content. For example, in case the first media content is a video recording of an event, then each of the plurality of media contents may include a video recording of the event being recorded from a plurality of distinct locations. For instance, the event may be a live concert and a plurality of users (from the audience) may be capturing the live concert (one of the plurality of media contents) on a respective media capturing device thereof. In this example embodiment, the first media content may be generated by performing editing of the plurality of media contents. In an example embodiment, the editing of the plurality of media contents may be performed manually. In another example embodiment, the editing of the plurality of media contents may be performed partially or at least in parts, automatically.

At 604, a first plurality of audio sections associated with the first audio track and a second plurality of audio sections associated with the second audio track may be determined. In an example embodiment, the first plurality of audio sections and the second plurality of audio sections may be determined based on one or more of a structure analysis, a beat analysis or a bar analysis of the first audio track and the second audio track, respectively. In an example embodiment, the audio sections of the first and second plurality of audio sections may include but are not limited to verse, chorus, solo and the like. In an example embodiment, the determination of the plurality of audio sections of the first and the second audio sections includes determining the boundaries of the plurality of audio sections in the respective audio track, for example, the first audio track and the second audio track. An example illustrating the plurality of audio sections of the first audio track and the second audio track is illustrated and described with reference to FIG. 3.

At 606, a plurality of mapping audio sections in the second audio track corresponding to the first plurality of audio sections may be determined. In an example embodiment, the plurality of mapping audio sections may be determined based on section mapping between the first plurality of audio sections and the second plurality of audio sections. In an example embodiment, the section mapping between the first plurality of audio sections and the second plurality of audio sections may be performed based on a determination of audio features associated with the first and second plurality of audio sections. In an example embodiment, the audio features associated with the first audio track and the second audio track may include an average spectrum of the audio track, spectral flux, estimated tempo, pulse clarity, mel frequency cepstral coefficients, and the like.

In an example embodiment, based on the determination of the audio features, a cross similarity matrix between the first set of audio features and the second set of audio features may be computed. In an example embodiment, x-axis of the cross similarity matrix may represent audio sections corresponding to the first audio track while y-axis of the cross similarity matrix may represent audio sections corresponding to the second audio track. In an example embodiment, the values of the cross similarity matrix may correspond to correlation measure (or similarity score) between the audio features associated with the first plurality of audio features and the second plurality of audio features. Various known and/or custom algorithms may be utilized for computing the cross similarity matrix. For example, Kullback-Liebler divergence may be utilized for computing the cross similarity matrix. An example of the computation of the cross similarity matrix is described further in detail with reference to FIG. 4.

In an example embodiment, based on the cross similarity matrix, a mapping of audio sections between the first audio track and the second audio track may be performed. For example, the audio section corresponding to an instrument audio in the first audio track may be mapped to the corresponding audio section in the second audio track. In an example embodiment, based on section mapping an optimized path may be determined through the cross similarity matrix, where the optimized path may be indicative of a best mapping of corresponding audio sections between the first audio track and the second audio track.

At 608, in an audio section of the first plurality of audio sections, relative position of at least one video transition with respect to the audio section is determined. In an example embodiment, the relative position of each of the video transitions with respect to the boundaries of the audio section may be determined. In an example embodiment, the boundaries of the audio section may be determined based on the time stamps associated with the audio sections.

At 610, in a mapping audio section belonging to the second audio track, at least one corresponding video transition may be created at a same relative position with respect to the mapping audio section as the relative position of the at least one video transition with respect to the audio section. For example, if a video transition is determined to be positioned/located at a distance equal to one-fourth length of the audio section from a start position of the audio section in the first audio track, a corresponding video transition in the second audio track may be created/positioned at the same relative distance (i.e. at one-fourth length distance of the corresponding audio section) from the mapping audio section in the second audio track. In an example embodiment, the position of the corresponding video transition may be aligned to beats and/or bars of the audio sections of the audio track.

At 612, the first audio track may be modified based on the corresponding at least one video transition in the mapping audio section to generate the second video track corresponding to the second audio track. Various example of modification of the first video track are illustrated and described in detail with reference to FIG. 5B. For example, in some embodiments, portions of the first video track may be cropped or fast-forwarded or slowed down so as to match with the second audio track. In certain scenarios, the portions of first video track may not be modified and utilized as-is for generating corresponding portions of the second video track. Various such example scenarios are further discussed in detail with reference to FIG. 7.

Figure 7A:
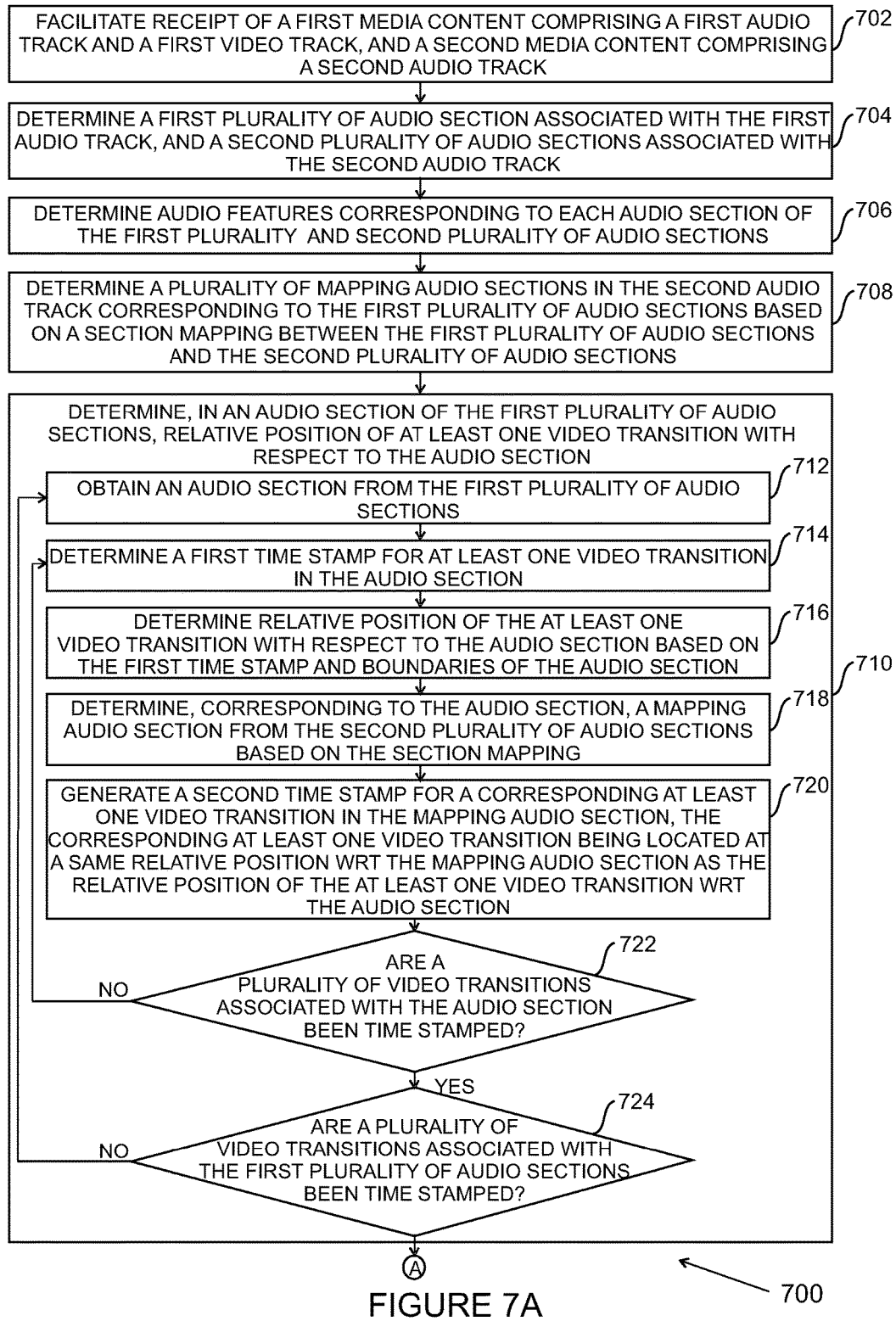
FIGS. 7A-7B illustrate an example flowchart depicting a method to perform editing of a media content, in accordance with another example embodiment.

FIG. 7 is a flowchart depicting example method 700 for editing of media content, for example a first media content, in accordance with an example embodiment. In an example embodiment, the method 700 includes facilitating access of the first media content and a second media content at an apparatus, for example the apparatus 200 (FIG. 2) and performing editing of the first media content based on the second media content for improving the quality of edited media content. The method 600 depicted in the flow chart may be executed by, for example, the apparatus 200 of FIG. 2.

At 702, the method 700 includes facilitating receipt of a first media content including a first audio track and a first video track, and a second media content including a second audio track. Examples of the first media content may include, but are not limited to, video, animation, collection of still images with background music, and/or combinations of these. The second media content may include an audio track that may be a studio recorded version of the first audio track or a song unrelated to the first audio track.

At 704, a first plurality of audio sections associated with the first audio track and a second plurality of audio sections associated with the second audio track may be determined. In an example embodiment, the audio sections, for example, the first plurality of audio sections and the second plurality of audio sections may be determined based on one or more of a structure analysis, a beat analysis and a bar analysis of the first audio track and the second audio track, respectively. Various examples of audio sections may include, but are not limited to, verse, chorus, solo and the like. An example illustrating the plurality of audio sections of the first audio track and the second audio track is illustrated and described with reference to FIG. 3.

At 706, audio features corresponding to each audio section of the first plurality of audio sections and the second plurality of audio sections may be determined. In an example embodiment, the audio features associated with the first audio track and the second audio track may include features such as an average spectrum of the audio track, spectral flux, estimated tempo, pulse clarity, mel frequency cepstral coefficients, and the like. In an example embodiment, the first plurality of audio features associated with the first audio track may be determined based at least on the time stamps associated with the first plurality of audio sections. In an example embodiment, a second plurality of audio features associated with the second audio track may be determined based at least on the time stamps associated with the second plurality of audio sections.

At 708, a plurality of mapping audio sections in the second audio track may be determined. In an example embodiment, the plurality of mapping audio sections may be corresponding to the first plurality of audio sections. In an example embodiment, the plurality of mapping audio sections may be determined based on a section mapping between the first plurality of audio sections and the second plurality of audio sections. In an example embodiment, the section mapping between the first plurality of audio features and the second plurality of audio features may be determined by computing a cross similarity matrix between the first plurality of audio sections and the second plurality of audio sections. An example of computing the cross similarity matrix between the first plurality of audio sections and the second plurality of audio sections is explained in detail with reference to FIG. 4. In an example embodiment, values of the cross similarity matrix includes correlation measures between associated audio sections of the first plurality of audio sections and the second plurality of audio sections. In an example embodiment, an optimal path through the cross similarity matrix may be determined based on the correlation measures. In an example embodiment, the optimal path may be indicative of a section mapping between the associated audio sections of the first audio track and the second audio track. An example of determination of the optimal path is described with reference to FIG. 4.

At 710, the method 700 includes determining, in an audio section of the first plurality of audio sections, relative position of at least one video transition belonging to the first video track with respect to the audio section. An example method for determining the relative positions of the plurality of audio sections with respect to corresponding audio sections is illustrated and described with reference to example method 712-724. At 712, an audio section is obtained from the first plurality of audio sections. At 714, a first time stamp for at least one video transition in the audio section is determined. At 716, the method 710 includes determining, in the audio section, relative position of the at least one video transition with respect to the audio section. In an example embodiment, the relative position of the at least one video transition may be determined based on the first time stamp and boundaries of the audio section. At 718, the method 710 includes determining, corresponding to the audio section, a mapping audio section from the second plurality of audio sections. At 720, a second time stamp for a corresponding at least one video transition is generated in the mapping audio section at a same relative position with respect to the mapping audio section as the relative position of the at least one video transition with respect to the audio section. It may be determined at 722, whether a plurality of video transitions associated with the audio section been time stamped. In an embodiment, on determination that the plurality of video transitions associated with the audio section have not been time stamped, the method at 714-720 is repeated till the plurality of video transitions associated with the audio section are time stamped. On determination at 722 that the plurality of video transitions associated with the audio section are time stamped, it is determined whether the plurality of video transitions associated with the first plurality of audio sections have been time stamped, at 724. In an example embodiment, on determination that the plurality of video transitions associated with the first plurality of audio sections have not been time stamped, the method at 712-722 is repeated till the plurality of video transitions associated with the first plurality of audio sections are time stamped. In an example embodiment, on time stamping the plurality of video transitions associated with the first plurality of audio sections, a plurality of time stamps associated with the plurality of video transitions may be stored at the apparatus 200.

At 726, the method 700 includes determining a first length of a portion of first video track (or a video segment) between the at least one video transition and boundaries of the mapping audio section. In an example embodiment, the first length may be determined based on the first time stamp associated with the at least one video transition and the time stamps associated with the boundaries of the audio section. At 728, a second length of a corresponding video segment occurring between the corresponding at least one video transition and boundaries of the mapping audio section may be determined. In an example embodiment, the second length of the corresponding video segment may be determined based on the section mapping and the second time stamp. At 730, the method 700 includes comparing the first length of the video segment in the audio section with the second length of the corresponding video segment in the corresponding audio section. Based on the comparison of the first length with the second length, it may be determined whether the first length is equal to the second length. If it is determined that the first length is equal to the second length, the video segment may be retained for generating a corresponding portion of the video segment in the second video track, at 732. If however it is determined at 730 that the first length is not equal to the second length, then at 734 it is determined whether the first length is greater than the second length. On determination of the first length being greater than the second length, it may further be determined whether the difference between the first length and the second length is greater than a first threshold distance, at 736. In an example embodiment, where the difference between the first length and the second length is greater than the first threshold distance, the excess length of the video segment between the video transitions may be cropped so as to match with the second length, at 738. In an example embodiment, the remaining of the cropped length of the video segment may be utilized for constructing the corresponding portion of the second video track. In another example embodiment, where the difference between the first length and the second length is determined to be shorter than the first threshold distance, the portion of the first video track may be fast-forwarded so as to match the first length with the second length, at 740.

If however, at 730 it is determined that the second length is greater than the first length, it may further be determined whether the difference between the first length and the second length is greater than a second threshold distance, at 742. In an example embodiment, where the difference between the first length and the second length is determined to be greater than the second threshold distance, a video transition may be created after the relative position of the at least one video transition in the video segment, at 744. In an example embodiment, the portion of the video segment between the created video transition and the previous video transition may be filled-up with one or more video tracks (from the first video track) being recorded at the same time. For example, in case of an event such as a live concert, a plurality of recordings of the event may be captured by a plurality of users and/or cameras installed at the location of live event. In an example embodiment, where the difference between the first length and the second length is determined to be greater than the second threshold distance, speed of playback of the portion of the first video track may be reduced to match the first length with the second length, at 746.

Further to performing one of retaining the video segment at 732, cropping the video segment at 738, fast forwarding the video segment at 740, creating a new video transition and filling the gap between the new transition and the boundary of the mapping audio section with a portion of video track at 744, and reducing the speed of playback of the video segment at 746, it may be determined at 748 whether a plurality of video segments corresponding to the second audio track have been determined. In an example embodiment, if it is determined that the plurality of video segments have not been considered, then a next video segment may be considered at 750, and the method from 726-748 is repeated till all the video segments have been considered for modification/retention in the second video track. In an example embodiment, if it is determined at 748 that the plurality of video segments are considered, then the plurality of video segments may be concatenated to generate the second video track. Various examples of modifying or retaining the portions of first video track, and thereafter concatenating the modified/retained portions (or video segments) so as to generate corresponding portions of the second audio track are illustrated and described with reference to FIG. 5B.

Figure 7B:
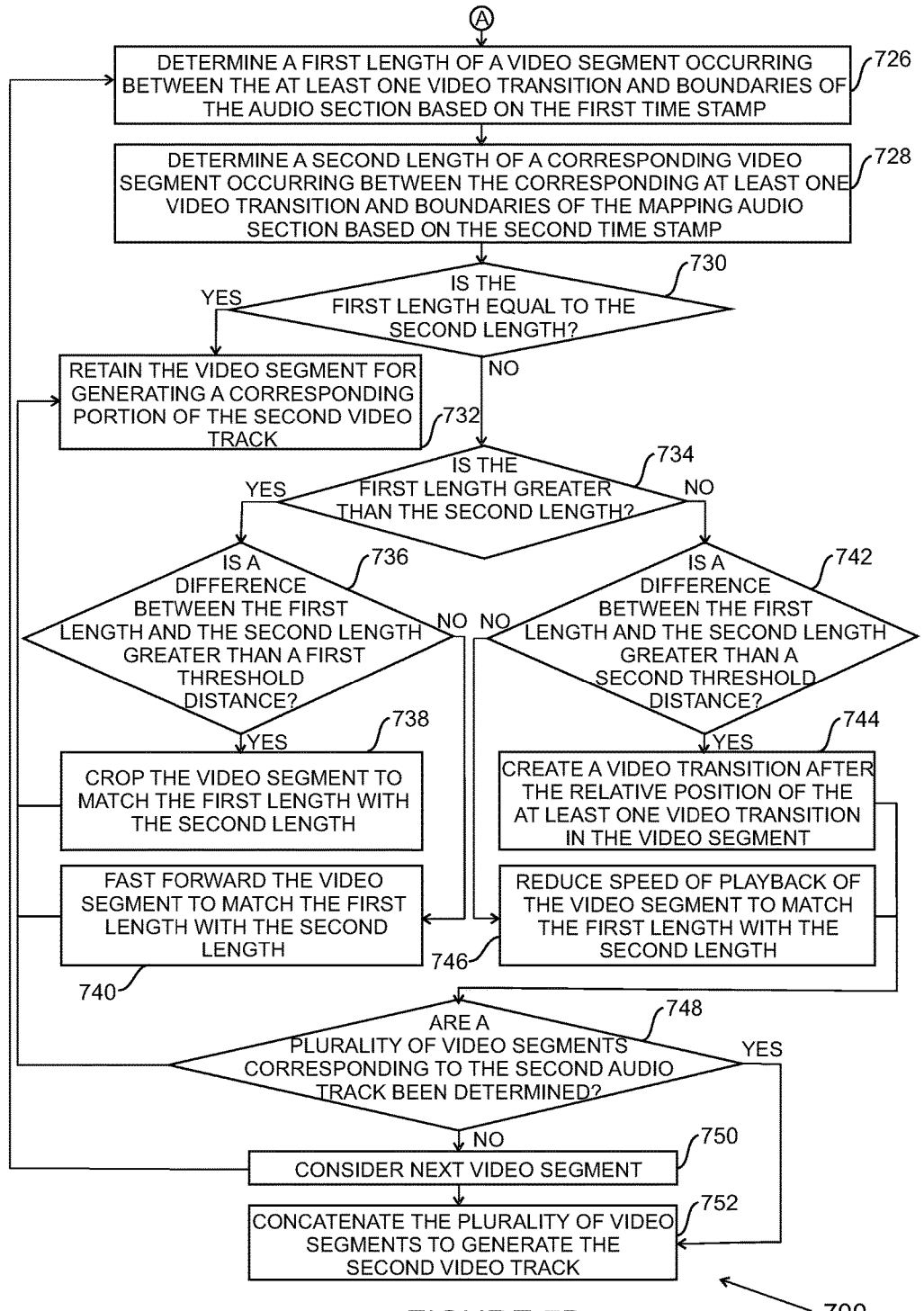

It should be noted that to facilitate discussions of the flowcharts of FIGS. 6-7B, certain operations are described herein as constituting distinct steps performed in a certain order. Such implementations are examples only and non-limiting in scope. Certain operation may be grouped together and performed in a single operation, and certain operations can be performed in an order that differs from the order employed in the examples set forth herein. Moreover, certain operations of the methods 600 to 700 are performed in an automated fashion. These operations involve substantially no interaction with the user. Other operations of the methods 600 to 700 may be performed by in a manual fashion or semi-automatic fashion. These operations involve interaction with the user via one or more user interface presentations.

The methods depicted in these flow charts may be executed by, for example, the apparatus 200 of FIG. 2. Operations of the flowchart, and combinations of operation in the flowcharts, may be implemented by various means, such as hardware, firmware, processor, circuitry and/or other device associated with execution of software including one or more computer program instructions. For example, one or more of the procedures described in various embodiments may be embodied by computer program instructions. In an example embodiment, the computer program instructions, which embody the procedures, described in various embodiments may be stored by at least one memory device of an apparatus and executed by at least one processor in the apparatus. Any such computer program instructions may be loaded onto a computer or other programmable apparatus (for example, hardware) to produce a machine, such that the resulting computer or other programmable apparatus embody means for implementing the operations specified in the flowchart. These computer program instructions may also be stored in a computer-readable storage memory (as opposed to a transmission medium such as a carrier wave or electromagnetic signal) that may direct a computer or other programmable apparatus to function in a particular manner, such that the instructions stored in the computer-readable memory produce an article of manufacture the execution of which implements the operations specified in the flowchart. The computer program instructions may also be loaded onto a computer or other programmable apparatus to cause a series of operations to be performed on the computer or other programmable apparatus to produce a non-transitory computer-implemented process such that the instructions, which execute on the computer or other programmable apparatus provide operations for implementing the operations in the flowchart. The operations of the methods are described with help of apparatus 200. However, the operations of the methods can be described and/or practiced by using any other apparatus.

Without in any way limiting the scope, interpretation, or application of the claims appearing below, a technical effect of one or more of the example embodiments disclosed herein is to edit the media content at an apparatus, for example, the apparatus 200. Various embodiments provide methods for facilitating access of first and second media content at an apparatus, and editing the first media content based on the second media content such that the edited media content may be of a better quality as compared to the quality of the first media content. The reasons for editing the first media content comprising a recorded video may include bad quality of the background music in a recorded video, and/or poor choice of the back ground music, and so on. Various embodiments provide methods and apparatus that facilitates editing media content in such a manner that the audio track in a recorded video may be changed to another version of the same audio track, or to another song altogether, so that the video transitions are automatically shifted/aligned at a same relative position in the edited media content as the relative position of the video transitions in the original media content. In various embodiments, the audio sections between the original media content and the edited media content are aligned based on one or more of the song structure analysis, beat analysis and bar analysis, thereby improving the quality of section mapping between the original and edited media content. Due to the alignment of the video transitions in the original and edited versions of the media content, various sections of the media content that are shuffled or are missing or are to be added may also be appropriately mapped in the edited media content. Various embodiments facilitate in adding/removing video transitions in the edited media content so as to match the audio track of the second media content with the edited video track. The adding/removing of the video transitions in the edited media content is performed in such a manner that the position of the video segments stay relatively in the same place in the original media content and the edited media content, thereby improving the quality of the media content.

Various embodiments described above may be implemented in software, hardware, application logic or a combination of software, hardware and application logic. The software, application logic and/or hardware may reside on at least one memory, at least one processor, an apparatus or, a computer program product. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of an apparatus described and depicted in FIGS. 1 and/or 2. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

Although various aspects of the embodiments are set out in the independent claims, other aspects comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present disclosure as defined in the appended claims.

The invention claimed is:

1. A method comprising:
   facilitating receipt of a first media content comprising a first audio track and a first video track, and a second media content comprising a second audio track;
   determining a first plurality of audio sections associated with the first audio track and a second plurality of audio sections associated with the second audio track;
   performing section mapping between the first plurality of audio sections and the second plurality of audio sections to determine a plurality of mapping audio sections in the second audio track corresponding to the first plurality of audio sections;
   determining, in a first audio section of the first plurality of audio sections, a relative position of at least one first video transition with respect to the first audio section;
   creating a corresponding at least one second video transition associated with the at least one first video transition with respect to a mapping audio section of the plurality of mapping audio sections, the mapping audio section corresponding to the determined first audio section of the first plurality of audio sections, the corresponding at least one second video transition being created at a same relative position with respect to the mapping audio section as the relative position of the at least one first video transition with respect to the first audio section; and
   modifying the first video track based on the relative position of the corresponding at least one second video transition in the mapping audio section to generate a second video track corresponding to the second audio track.

2. The method as claimed in claim 1, further comprising determining audio sections of the first plurality of audio sections and the second plurality of audio sections based on one or more of music structure analysis, beat analysis and bar analysis of the first audio track and the second audio track, respectively.

3. The method as claimed in claim 2, further comprising determining audio features corresponding to the audio sections of the first plurality of audio sections and the second plurality of audio sections.

4. The method as claimed in claim 3, wherein the audio features associated with the audio sections of the first plurality of audio sections and the second plurality of audio sections comprises one or more audio features of an average spectrum, spectral flux, estimated tempo, pulse clarity, and mel frequency cepstral coefficients.

5. The method as claimed in claim 1, wherein creating the corresponding at least one second video transition comprises, performing for the first plurality of audio sections:
   determining, in the first audio section having the at least one first video transition from the first plurality of audio sections, a first time stamp for the at least one first video transition;
   determining, in the first audio section, the relative position of the at least one first video transition with respect to boundaries of the first audio section based on the first time stamp;
   based on the relative position of the at least one first video transition with respect to the boundaries of the first audio section, determining a corresponding at least one video transition in the mapping audio section from the plurality of mapping audio sections based on the section mapping; and
   generating a second time stamp for the determined corresponding at least one video transition in the mapping audio section at a same relative position as the relative position of the at least one first video transition with respect to the first audio section.

6. The method as claimed in claim 1, wherein generating the second video track comprises performing for the first audio section of the first plurality of audio sections:
   facilitating receipt of a first time stamp and a second time stamp associated with the at least one first video transition with respect to the first audio section and the corresponding at least one second video transition of the mapping audio section, respectively;
   facilitating receipt of boundaries of the first audio section and the mapping audio section based on the section mapping between the first audio track and the second audio track;
   determining a first length of a video segment occurring between the at least one first video transition and the boundaries of the first audio section based on the first time stamp;
   determining a second length of a corresponding video segment occurring between the corresponding at least one second video transition and boundaries of the mapping audio section based on the second time stamp;
   comparing the first length with the second length; and
   performing one of, modifying and retaining, a portion of the first video track associated with the first length based on the comparison, to generate a corresponding portion of the second video track.

7. The method as claimed in claim 6, wherein modifying the portion of the first video track comprises: cropping the portion of the first video track to match the first length with the second length based on determination of the second length being shorter than the first length and a difference between the first length and the second length being greater than a first threshold distance.

8. The method as claimed in claim 6, wherein modifying the portion of the first video track comprises: fast forwarding the portion of the first video track to match the first length with the second length based on determination of the second length being shorter than the first length and a difference between the first length and the second length being less than a first threshold distance.

9. The method as claimed in claim 6, wherein modifying the portion of the first video track comprises: reducing speed of playback of the portion of the first video track to match the first length with the second length based on determination of the second length being greater than the first length and a difference between the second length and the first length being less than a second threshold distance.

10. The method as claimed in claim 6, wherein modifying the portion of the first video track comprises: creating a video transition after the relative position of the at least one first video transition in the portion of the first video track based on determination of the second length being greater than the first length, and a difference between the second length and the first length being greater than a second threshold distance.

11. The method as claimed in claim 6, wherein retaining the portion of first video track comprises: utilizing the video segment associated with the first length for generating a corresponding portion of the second video track based on determination of the first length being equal to the second length.

12. The method as claimed in claim 1, wherein the first audio track being unrelated to the second audio track.

13. An apparatus comprising:
   at least one processor; and
   at least one memory comprising computer program code, the at least one memory and the computer program code configured to, with the at least one processor, cause the apparatus to at least perform:
      facilitate receipt of a first media content comprising a first audio track and a first video track, and a second media content comprising a second audio track;
      determine a first plurality of audio sections associated with the first audio track and a second plurality of audio sections associated with the second audio track;
      perform section mapping between the first plurality of audio sections and the second plurality of audio sections to determine a plurality of mapping audio sections in the second audio track corresponding to the first plurality of audio sections;
      determine, in a first audio section of the first plurality of audio sections, a relative position of at least one first video transition with respect to the first audio section;
      create a corresponding at least one second video transition associated with the at least one first video transition with respect to a mapping audio section of the plurality of mapping audio sections, the mapping audio section corresponding to the determined first audio section of the first plurality of audio sections, the corresponding at least one second video transition being created at a same relative position with respect to the mapping audio section as the relative position of the at least one first video transition with respect to the first audio section; and
      modify the first video track based on the relative position of the corresponding at least one second video transition in the mapping audio section to generate a second video track corresponding to the second audio track.

14. The apparatus as claimed in claim 13, wherein to create the corresponding at least one second video transition, the apparatus is further caused, at least in part, to perform for the first plurality of audio sections:
determine, in the first audio section having the at least one first video transition from the first plurality of audio sections, a first time stamp for the at least one first video transition;
determine, in the first audio section, the relative position of the at least one first video transition with respect to boundaries of the first audio section based on the first time stamp;
based on the relative position of the at least one first video transition with respect to the boundaries of the first audio section, determine a corresponding at least one video transition in the mapping audio section from the plurality of mapping audio sections based on the section mapping; and
generate a second time stamp for the determined corresponding at least one video transition in the mapping audio section at a same relative position as the relative position of the at least one first video transition with respect to the first audio section.

15. The apparatus as claimed in claim 13, wherein to generate the second video track, the apparatus is further caused, at least in part to perform for the first audio section of the first plurality of audio sections:
facilitate receipt of a first time stamp and a second time stamp associated with the at least one first video transition with respect to the first audio section and the corresponding at least one second video transition of the mapping audio section, respectively;
facilitate receipt of boundaries of the first audio section and the mapping audio section based on the section mapping between the first audio track and the second audio track;
determine a first length of a video segment occurring between the at least one first video transition and the boundaries of the first audio section based on the first time stamp;
determine a second length of a corresponding video segment occurring between the corresponding at least one second video transition and boundaries of the mapping audio section based on the second time stamp;
compare the first length with the second length; and
performing one of, modifying and retaining, a portion of the first video track associated with the first length based on the comparison, to generate a corresponding portion of the second video track.

16. The apparatus as claimed in claim 15, wherein to modify the portion of the first video track, the apparatus is further caused, at least in part to crop the portion of the first video track to match the first length with the second length based on determination of the second length being shorter than the first length and a difference between the first length and the second length being greater than a first threshold distance.

17. The apparatus as claimed in claim 15, wherein to modify the portion of the first video track, the apparatus is further caused, at least in part to fast forward the portion of the first video track to match the first length with the second length based on determination of the second length being shorter than the first length and a difference between the first length and the second length being less than a first threshold distance.

18. The apparatus as claimed in claim 15, wherein to modify the portion of the first video track, the apparatus is further caused, at least in part to reduce speed of playback of the portion of the first video track to match the first length with the second length based on determination of the second length being greater than the first length and a difference between the second length and the first length being less than a second threshold distance.

19. The apparatus as claimed in claim 15, wherein to modify the portion of the first video track, the apparatus is further caused, at least in part to create a video transition after the relative position of the at least one video transition in the portion of the first video track based on determination of the second length being greater than the first length and a difference between the second length and the first length being greater than a second threshold distance.

20. A computer program product comprising at least one non-transitory computer-readable storage medium, the computer-readable storage medium comprising a set of instructions, which, when executed by one or more processors, cause an apparatus to at least perform:
facilitate receipt of a first media content comprising a first audio track and a first video track, and a second media content comprising a second audio track;
determine a first plurality of audio sections associated with the first audio track and a second plurality of audio sections associated with the second audio track;
perform section mapping between the first plurality of audio sections and the second plurality of audio sections to determine a plurality of mapping audio sections in the second audio track corresponding to the first plurality of audio sections;
determine, in a first audio section of the first plurality of audio sections, a relative position of at least one first video transition with respect to the first audio section;
create a corresponding at least one second video transition associated with the at least one first video transition with respect a mapping audio section of the plurality of mapping audio sections, the mapping audio section corresponding to the determined first audio section of the first plurality of audio sections, the corresponding at least one second video transition being created at a same relative position with respect to the mapping audio section as the relative position of the at least first one video transition with respect to the first audio section; and
modify the first video track based on the relative position of the corresponding at least one second video transition in the mapping audio section to generate a second video track corresponding to the second audio track.

* * * * *